United States Patent
McFadden et al.

(10) Patent No.: US 12,105,218 B2
(45) Date of Patent: Oct. 1, 2024

(54) NOISE REDUCTION IN AN ULTRA-WIDEBAND (UWB) RADAR

(71) Applicant: Xonar Technology Inc., Largo, FL (US)

(72) Inventors: Jeffrey McFadden, Dunedin, FL (US); Stan Ivanov, St. Petersburg, FL (US)

(73) Assignee: Xonar Technology Inc., Largo, FL (US)

( * ) Notice: Subject to any disclaimer, the term of this patent is extended or adjusted under 35 U.S.C. 154(b) by 373 days.

(21) Appl. No.: 17/600,865

(22) PCT Filed: Apr. 3, 2020

(86) PCT No.: PCT/US2020/026584
§ 371 (c)(1),
(2) Date: Oct. 1, 2021

(87) PCT Pub. No.: WO2020/214435
PCT Pub. Date: Oct. 22, 2020

(65) Prior Publication Data
US 2022/0171017 A1 Jun. 2, 2022

Related U.S. Application Data

(60) Provisional application No. 62/828,637, filed on Apr. 3, 2019, provisional application No. 62/828,628, filed on Apr. 3, 2019.

(51) Int. Cl.
*G01S 7/02* (2006.01)
*G01S 7/03* (2006.01)
(Continued)

(52) U.S. Cl.
CPC .............. *G01S 7/023* (2013.01); *G01S 7/027* (2021.05); *G01S 7/038* (2013.01);
(Continued)

(58) Field of Classification Search
CPC .......... G01S 7/023; G01S 7/027; G01S 7/038; G01S 13/0209; G01S 13/887; G01S 13/888; H01Q 17/001
See application file for complete search history.

(56) References Cited

U.S. PATENT DOCUMENTS 9,316,732 B1 * 4/2016 Mohamadi .......... G01S 13/0209
10,012,720 B2 * 7/2018 Emanuelsson ......... H01Q 1/528
(Continued)

FOREIGN PATENT DOCUMENTS

| CN | 102857287 A | 1/2013 |
|---|---|---|
| CN | 106104969 A | 11/2016 |

(Continued)

OTHER PUBLICATIONS

17600865_2024-01-31_EP_2159605_A1_M.pdf, machine translation of EP-2159605-A1 (Year: 2010).*

(Continued)

*Primary Examiner* — Timothy A Brainard
*Assistant Examiner* — Kenneth W Good
(74) *Attorney, Agent, or Firm* — Fishman Stewart PLLC

(57) ABSTRACT

An ultra-wideband (UWB) system includes an enclosure, and an ultra-wideband (UWB) transmitter array within the enclosure, the UWB transmitter array having a transmitter component that transmits electromagnetic waves toward a region-of-interest (ROI), the UWB array having a receiver component that receives reflected electromagnetic waves from objects in the ROI and generates object data. The system further includes a radar absorbing material positioned to receive electromagnetic waves transmitted from the transmitter component that are not directed toward the ROI, and a pattern recognition device having a processor configured to process the electromagnetic waves reflected (Continued)

from the ROI and to determine whether an object-of-interest (OOI) pattern is recognized within the object data.

14 Claims, 16 Drawing Sheets

(51) Int. Cl.
*G01S 13/02* (2006.01)
*G01S 13/88* (2006.01)
*H01Q 17/00* (2006.01)

(52) U.S. Cl.
CPC ........ *G01S 13/0209* (2013.01); *G01S 13/887* (2013.01); *H01Q 17/001* (2013.01)

(56) References Cited

U.S. PATENT DOCUMENTS

| | | | |
|---|---|---|---|
| 2005/0179578 A1 | 8/2005 | Healy | |
| 2013/0002488 A1 | 1/2013 | Wang | |
| 2015/0253422 A1* | 9/2015 | Morton | G01S 13/887 342/146 |
| 2015/0260835 A1 | 9/2015 | Widmer | |
| 2015/0263425 A1* | 9/2015 | Gillard | H01Q 15/0013 342/6 |
| 2016/0329635 A1 | 11/2016 | Tsutsumi | |
| 2016/0359235 A1* | 12/2016 | Driscoll | H01Q 15/148 |
| 2016/0370456 A1 | 12/2016 | Emanuelsson | |
| 2017/0179611 A1* | 6/2017 | Eide | H01Q 9/40 |
| 2019/0057233 A1 | 2/2019 | Scott | |
| 2020/0158859 A1* | 5/2020 | Morton | G01S 13/887 |

FOREIGN PATENT DOCUMENTS

| | | | | |
|---|---|---|---|---|
| CN | 106257304 A | 12/2016 | | |
| CN | 106415324 A | 2/2017 | | |
| CN | 109375220 A | 2/2019 | | |
| EP | 2159605 A1 * | 3/2010 | ......... | G01S 13/0209 |
| JP | 2016213673 A | 12/2016 | | |
| JP | 2017514109 A | 6/2017 | | |
| WO | 2015115906 A1 | 8/2015 | | |

OTHER PUBLICATIONS

IPRP dated Oct. 14, 2021 for copending International Appl. No. PCT/US2020/026584.
English abstract for EP2159605.
Japan Office Action, JP2021-557961, dated Jan. 4, 2024 (w_machine_translation).
Chinese Office Action and Chinese Search Report dated Apr. 25, 2024 for Chinese Patent App. No. 202080025698.6 (w_machine_translation).

* cited by examiner

NOISE REDUCTION IN AN ULTRA-WIDEBAND (UWB) RADAR

CROSS-REFERENCE TO RELATED APPLICATIONS

The present application is a national phase of and claims priority to International Patent Application No. PCT/US2020/026584, filed on Apr. 3, 2020, which claims priority to U.S. Patent Application No. 62/828,628 filed Apr. 3, 2019 and U.S. Patent Application No. 62/828,637 filed Apr. 3, 2019, and the contents of all applications are incorporated herein by reference in their entirety.

FIELD OF TECHNOLOGY

Exemplary fields of technology for the present disclosure may relate to, for example, security screening and object detection using ultra-wideband (UWB) radar.

BACKGROUND

With gun violence becoming an increasing threat in society, mechanisms for detecting weapons that have been concealed on an individual or in a bag or backpack are becoming more relevant. Recent events have shown that many public gathering areas can be the subject of unexpected tragedy and it is increasingly important to be able to scan and detect concealed weapons and contraband in a public setting.

Traditionally, scanning equipment and metal detectors have been used in areas where security is expected to be tight, and the public has come to expect occasional inconveniences to support overall safety in a given location. Locations may include airports, voting lines, entrances to court houses and other government buildings, sports stadiums, and the like. Scanning may include the use of metal detectors, radiofrequency (RF) detection systems, x-rays, or other traditional and known methods and systems for screening individuals. However, as effective as many of these systems have been, these systems may include shortcomings that need to be addressed.

For instance, metal detection equipment typically is set up at a security checkpoint, where individuals remove metal-based materials that then pass through an x-ray screening system. These checkpoints can be expensive to run and can cause bottlenecks in the amount of people that may pass through a given area. One known example is in airports. A staff of security people controls passage through a walk-through metal detector—having to deal with the many positive indicators to the presence of metal, such as when a traveler inadvertently leaves a metal belt-buckle on their person. The screening staff single out the individual and pass a magnetic wand to detect and identify the item that caused the positive to occur. At the same time, airline bags are passed through an x-ray scanning device, which likewise can be expensive, time-consuming, and may result in additional searching and delay.

Other known systems commercially available utilize technologies such as a magnetometer (i.e., a metal detector) or sub-millimeter wave imaging. These systems are large in size, may be ineffective for not positively identifying threats, as well as indicating there is a threat when in reality one is not present, and may include individuals walking through a cordoned off area and stopping to be imaged. Other known systems use sensors (typically vision based systems) which detect and track an individual in a defined space. Typically, however, such systems are unable to track an individual when they are behind or blocked by an opaque object such as a wall or partition, and vision-based systems can present privacy concerns (such as a concern that images may become publicly available and for nefarious purposes).

Furthermore, such levels of security are not always practical for many events and locations. For instance, sporting events, malls, voting (often set up as a temporary arrangement such as in a school, church, or synagogue), and rock concerts, as examples, may have many thousands of people that pass through security in a very short period of time. Metal detectors are typically employed, but they can also cause bottlenecks at events, may be impractical and expensive to deploy, and may not detect all items that present a possible threat to public safety. Some venues, such as churches and synagogues, are antithetical to the concept of overt security screening and it may be undesirable to employ metal detection and other security screening methods.

In addition, locations having many thousands of attendees may have numerous entrances and exits and it can be impractical to screen all areas. Schools, for instance, may have only a few security personnel to manage overall safety. It may be impractical to employ sufficient numbers of screening personnel, so alternatives may include limiting the number of entrances and exits or limiting hours of operation. In any event, the overall purpose of the school may be limited, and the school may not be used to its full potential, as a result of limiting access for public safety purposes.

More generally, many public events and locations open to the public have similar or related challenges, and insufficient budget or wherewithal to effectively minimize the associated and evolving dangers that are faced. Adding security may ultimately lead to more secure events and facilities, while at the same time detracting from the pleasure or nature of the event.

Thus, other and more covert screening systems and methods have been developed. One known method includes an ultra-wideband (UWB) screening system that employs several radar transceivers arranged in a planar array that transmit UWB pulse signals. The UWB pulses are transmitted, and synchronized reflections are received and combined to construct an image of the subject. Because of the image reconstruction requirements and other functions of the system, such a system may be computationally intensive, and obtaining sufficient imaging data may include several transceivers to obtain sufficient resolution to properly detect and identify a threat.

Another known method may include identifying objects through their resonant frequencies in a UWB system. At a given angular orientation an object such as a weapon may emit a unique signature and/or an increase in magnitude at its resonant frequency, which can then be identified when frequency scanning to detect a particular resonant frequency in a UWB system. However, an object's resonant frequency can be highly dependent on its angular orientation with respect to the UWB transceiver, and a given object may be 'calibrated' to identify its resonant frequency—not only as a function of its angular orientation, but in its much broader orientation within 3-space. Each type of weapon may then be correlated with a table or mathematical construct that relates resonant frequency with object orientation. Although such a system may work for individual weapons or firearms, separate tables and mathematical constructs may have to be developed or calibrated for each of the many individual weapon types and models, which can be burdensome and impractical. In addition, the system may not be calibrated for a particular weapon, so therefore may not be detected or identified.

Yet another known system includes an ultra-wideband (UWB) array having a transmitter that transmits electromagnetic waves as UWB pulses toward a region-of-interest (ROI), and having a receiver that receives reflected electromagnetic waves from objects in the ROI and generates object data, and a pattern recognition device having a processor configured to provide operations. The processor is configured to provide instructions that obtain scanning data from reflected electromagnetic waves from the ROI until an event is triggered, when the event is triggered, the processor accesses a heuristic function created from calibration data that was previously obtained using the ROI with an object-of-interest (OOI) present and with an OOI not present and using the UWB array, analyze the scanning data with the heuristic function to determine whether an OOI pattern is recognized within the scanning data, and if an OOI pattern is recognized, generate an alert.

However, these known UWB-based systems may be dependent on high signal-to-noise ratios (SNRs) to operate properly, and in some systems by their very nature the SNR may be low. Various factors may also contribute to low SNR. For instance, in an RF enclosure that houses a transmission and/or receive antenna, energy transmitted from side and back lobes (e.g., not in an intended direction) of the transmitter can cause noise levels to be unacceptable. One example is that of a patch antenna, which is directional in that a majority of transmitted energy is emitted from the front of the antenna as a main lobe. However, emitted radiation may include a back lobe that emits in a direction opposite that of the main lobe, or side lobes that may emit in random directions off-direction from either the main lobe or the back lobe. Objects positioned in the RF enclosure, or the RF enclosure itself, can cause the undesirable off-direction emissions to reflect back to the antenna, which manifests itself as noise in the antenna and therefore a reduced SNR. The reduced SNR may not only reduce the effectiveness of the UWB system, but it may actually compromise the ability of the UWB system to properly identify weapons and other objects.

Accordingly, there is a need for an improved system configuration in UWB-based systems for weapon and object detection.

DETAILED DESCRIPTION

A system includes an ultra-wideband (UWB) array having a transmitter that transmits electromagnetic waves as UWB pulses toward a region-of-interest (ROI), and having a receiver that receives reflected electromagnetic waves from objects in the ROI and generates object data, and a pattern recognition device having a processor configured to provide operations. The processor is configured to provide instructions that obtain scanning data from reflected electromagnetic waves from the ROI until an event is triggered, when the event is triggered, access a heuristic function created from calibration data that was previously obtained using the ROI with an object-of-interest (OOI) present and with an OOI not present and using the UWB array, analyze the scanning data with the heuristic function to determine whether an OOI pattern is recognized within the scanning data, and if an OOI pattern is recognized, generate an alert.

The exemplary ultra-wideband (UWB) system includes an enclosure, and includes an ultra-wideband (UWB) transmitter array within the enclosure, the UWB transmitter array having a transmitter component that transmits electromagnetic waves toward a region-of-interest (ROI), the UWB array having a receiver component that receives reflected electromagnetic waves from objects in the ROI and generates object data. The system further includes a radar absorbing material positioned to receive electromagnetic waves transmitted from the transmitter component that are not directed toward the ROI, and a pattern recognition device having a processor configured to process the electromagnetic waves reflected from the ROI and to determine whether an object-of-interest (OOI) pattern is recognized within the object data.

Figure 1:
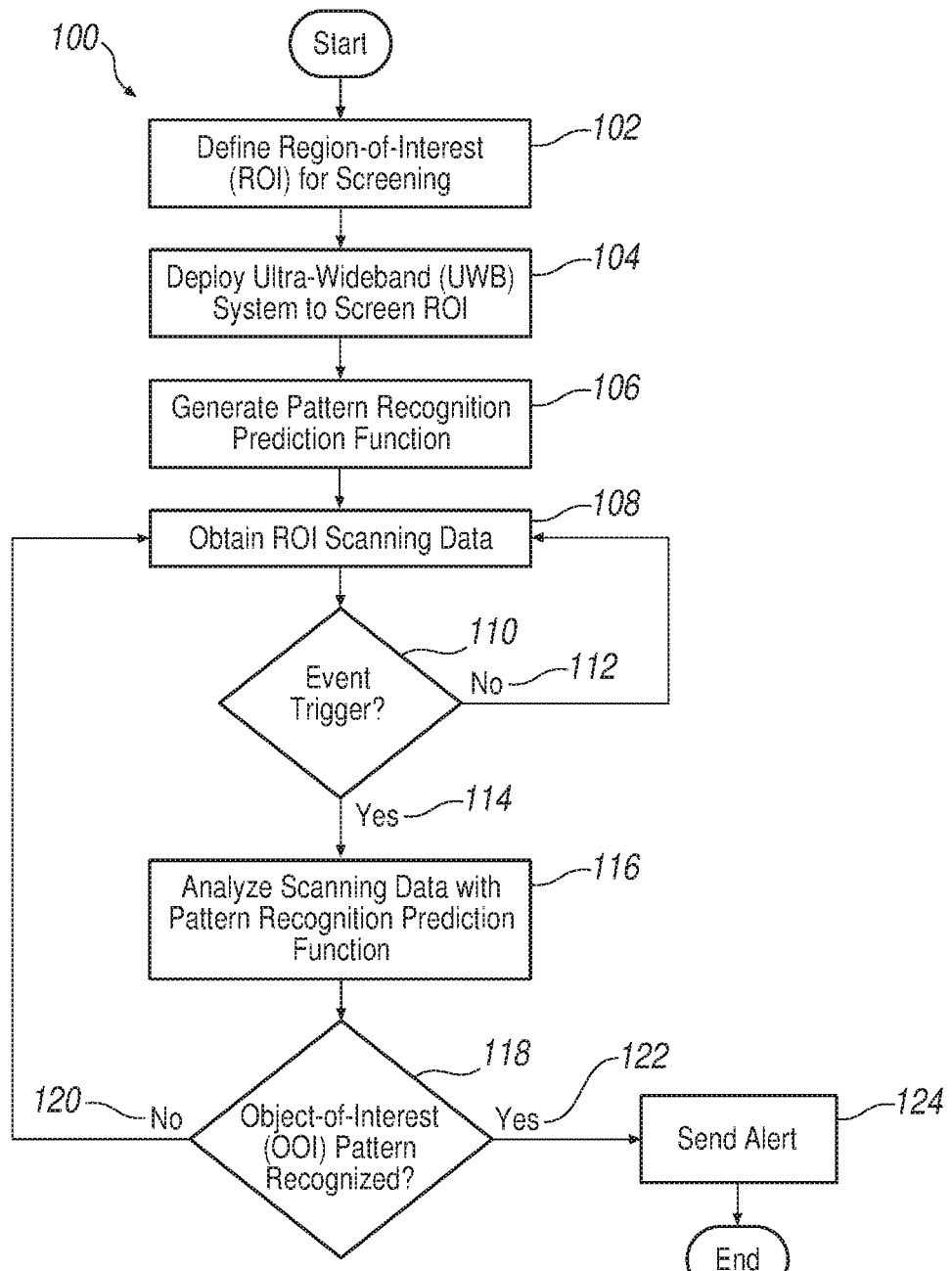
FIG. 1 illustrates exemplary steps for predicting the presence of an object-of-interest (OOI)

FIG. 1 illustrates exemplary steps for deploying a UWB system and predicting the presence of an object-of-interest (OOI) pattern. Method or process 100 includes defining a region-of-interest (ROI) at step 102. At step 104 an ultra-wideband (UWB) system is deployed or otherwise arranged to screen the ROI. The ROI may include a walkway or passageway where individuals pass, or an area where individuals may gather. At step 106 pattern-recognition calibration or a 'prediction function' is generated using pre-processed data from a UWB system that is fed into a pattern recognition device. The system is based on a convolutional neural network (CNN) architecture. The pattern recognition system includes a calibration step that includes determining the 'prediction function' that is created in a 'learning environment' that, in one example, may encompass a region-of-interest (ROI) where the disclosed system is deployed.

After deployment of the UWB system at step 104, the prediction function is generated at step 106 and the system is thereby calibrated for operation. That is, in the learning environment, the UWB system is taught known 'ground truth' data patterns consistent with two primary conditions:

1) a weapon or object-of-interest (OOI) is present on an individual;
2) the individual is not carrying a weapon or (OOI).

The 'ground truth' data patterns are obtained in conditions that will be later used to detect the presence of a known object or OOI. For instance, in the example above, 'ground truth' calibration data patterns are obtained under two conditions—one where an OM is present on an individual, and a second where the individual is present but the OM is not. The OM may be a weapon or handgun, but is not limited to such a device and may instead include any material that may be held on an individual that can be identified with a unique signature. Thus, an OOI may include contraband (such as a flask for carrying liquor), a rifle, or any device that may be deemed dangerous or illegal in a particular venue. For the two conditions described, UWB scanning data is obtained by projecting electromagnetic waves from the UWB to the ROI, and reflections from objects within the ROI is gathered as data and analyzed to generate the 'ground truth' data patterns. In one example, the calibration patterns are obtained on a test stand and without a human present. Additionally, it is contemplated that the environment or ROI where calibration occurs may itself change while screening individuals against a calibrated background. When in use and screening is occurring, the ROI may change due to movement of an item within the ROI, such as movement of a background item such as a garbage can or other item or items that form a background signature.

The resultant 'training set' of calibration data thereby includes the two primary data sets obtained during the calibration step, one that (in this example) includes weapon or OM pattern data, and the second having no weapon or pattern OM data. Both datasets are labeled or otherwise identified as the 'ground truth' datasets that are run through a training or calibration heuristic based on the CNN architecture. The heuristic is a multi-layered heuristic that performs a convolution process on the datasets, ultimately yielding the 'prediction function'.

Once the 'prediction function' is set and the calibration data is determined for the given environment where deployed, screening commences in a live environment. At step 108 ROI scanning data is obtained in the ROI, and event triggers occur when an individual passes in the ROI, at step 110. That is, as scanning data is obtained and pre-processed, if no event is triggered (i.e., a change in the data patterns) at step 112, then control returns to step 108 and scanning data of the ROI is obtained. An event is triggered when scanning data obtained results in a change in the pattern recognition above a certain threshold. In other words, aside from noise and other background events, an event is not triggered until a change in the pattern recognition meets a threshold that is above background, in one example.

When an event is triggered, such as an individual passing through the ROI, step 114, then at step 116 the scanned and pre-processed data is fed into a pattern recognition system, and the scanning data is compared to the calibration data, and at step 118, if appropriate thresholds against the calibration data are not met 120, then an OOI pattern is not recognized and control returns to step 108. Thus, step 116 includes at least accessing a heuristic created from calibration data when an event is triggered, the calibration data previously obtained using the ROI and using a UWB array, and analyzing the scanning data utilizing a pattern recognition function derived from the calibration data at the ROI and using the UWB array. That is, when the event is triggered, a prediction scheme is invoked that is created from calibration data that was previously obtained using the ROI and using the UWB array, and the scanning data is compared to the calibration data utilizing a pattern recognition function derived from the calibration data.

However, if thresholds for determining the OOI pattern in the scanned data are met 122, an OOI may be present and an alert is sent at step 124. Typically, further intervention occurs to confirm whether the OOI pattern indeed is an actual OOI, or if a "false positive" has occurred. The alert may include any number of mechanisms, such as a silent alarm, a signal sent to a monitoring device, or a loud alarm to alert others that may be present in the vicinity, as examples.

In one example, an average of individual interval predictions may be evaluated against an established threshold value to make a final prediction. As will be further discussed, the disclosed UWB system may include a single array of UWB transmitters and receivers, or multiple UWB transmitters and receivers. In an exemplary environment that includes multiple arrays, a prediction of weapon or OOI location on an individual may be made, as well.

Further, although the disclosed system includes OOI as a weapon or contraband, it is contemplated that any patterns identifiable using scanning data may be employed. For instance, the disclosed system and 'prediction function' step 106 may be employed by training to include facial recognition or other patterns that can be fed into a pattern recognition system. And, OOI patterns subsequently identified as a weapon or handgun are not limited to the particular item used to obtain the 'training set'. Thus, training set may be obtained using a handgun such as a revolver, but subsequent use identifies other types of handguns such as a semi-automatic pistol which are identified using UWB data calibrated for, for instance, a handgun.

Figure 2:
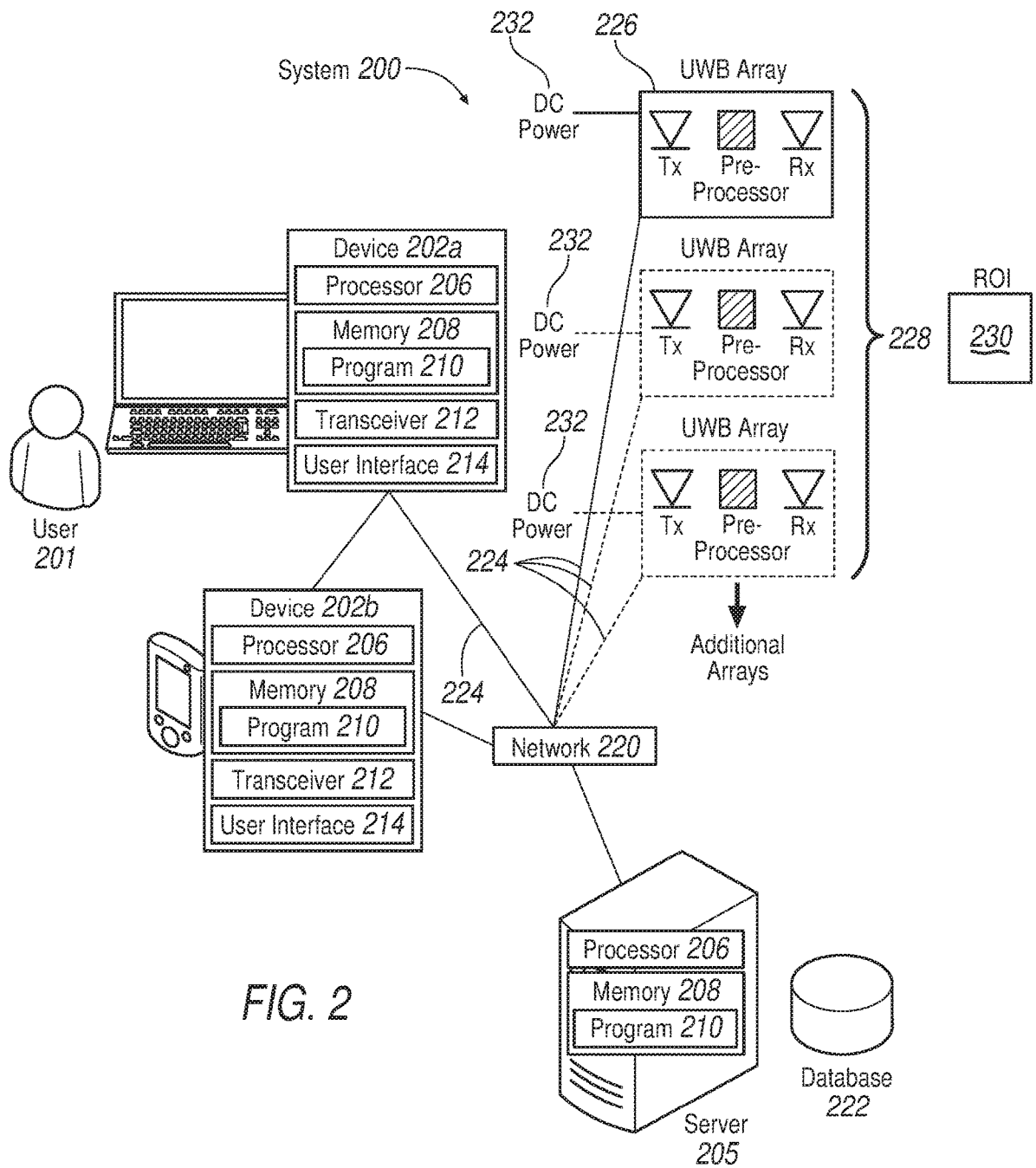
FIG. 2 illustrates an exemplary system of the present disclosure.

FIG. 2 illustrates an exemplary system 200, for example, to operate one or more radar transceiver arrays. Each radar transceiver array is operated independently of others, and therefore may be operated in a non-synchronized manner. That is, each radar transceiver array can be independently operated and in a stand-alone arrangement to detect an OOI pattern, (i.e., for a weapon such as a handgun), and does not include or require information from another radar transceiver array to detect or identify an OOI pattern, and does not require additional information from other imaging systems such as in an image-based system. And, although multiple radar transceiver arrays may be employed, additional radar transceiver arrays may be beneficial to provide additional or redundant coverage of the region-of-interest (or ROI), or to enlarge coverage in a ROI, but a single radar transceiver array is sufficient for OOI pattern detection or identification.

System 200 may therefore take many different forms and include multiple and/or alternate hardware components and facilities. While an exemplary system 200 is shown in FIG. 2, the exemplary components illustrated in FIG. 2 are not intended to be limiting, may be optional, and are not essential to any other component or portion of system 200. Indeed, additional or alternative components and/or implementations may be used.

System 200 may include or be configured to be utilized by a user 201 such as screening or security personnel. System 200 may include one or more of devices 202*a*, 202*b*, and/or server 205, which may include a processor 206 having a pattern recognition device, memory 208, a program 210, a transceiver 212, and a user interface 214. System 200 may include hub or network 220, database 222, and connections 224. Devices may include any or all of device 202*a* (e.g., a desktop, laptop, or tablet computer), and device 202*b* (e.g., a mobile or cellular phone). Processor 206 may include a hardware processor that executes program 210 to provide any or all of the operations described herein (e.g., by devices 202*a*, 202*b*, server 205, database 222, or any combination thereof) and that are stored as instructions on memory 208 (e.g., of device 202*a*, 202*b*, server 205, or any combination thereof). Processor 206 in server 205 includes a pattern recognition heuristic that is capable of learning from data, and can enhance its learning through heuristics or other 'rules of thumb' that may be present or identified based on its learning ability, and can write its own heuristics or predictive functions. In addition, the disclosed system and the OOI pattern identified herein may not be limited to a physical OOI such as a weapon or contraband. OOI and OOI patterns may include not only weapons and contraband, but may include facial recognition based on data that may be obtained during a 'training session' or calibration session when a prediction function, such as in step 106 above, is performed. In fact, OOI and OOI patterns may include any item or items that contain recognizable patterns such as cell phones, whiskey flasks, ammunition for handguns or rifles, or other items that may be prohibited from a particular venue.

Exemplary system 200 may include user interface 214, processor 206, and memory 208 having program 210 communicatively connected to processor 206. System 200 may further include transceiver 212 that may be communicatively connected to one ultra-wideband (UWB) transmitter array 226, or to one or more UWB transmitter arrays 228. System 200 may be set up to direct the one or more UWB transmitter arrays 228 toward, or even to define, an ROI 230. UWB transmitter array 226, or multiple UWB transmitter arrays 228, each include a respective DC power 232. More specifically, only one UWB transmitter array 226 is sufficient to provide scanning. Additional or redundant UWB transmitter arrays 228 may provide additional and beneficial scanning information to provide yet additional coverage, or an entirely different ROI altogether. However, interaction between additional UWB arrays is not required. This distinction is in contrast to some known systems that use multiple arrays to generate an image. The disclosed system may operate in a stand-alone and single UWB array.

System 200 using processor 206 may provide operations that include displaying by way of user interface 214 operational commands, parameters for a given or specific setup, or results of screening procedures when an OOI pattern is detected, as examples.

System 200 may include an overall network infrastructure through which any of devices 202*a*, 202*b*, server 205, and database 222 may communicate, for example, to transfer information between any portion of system 200 using connections 224. In general, a network (e.g., system 200) may be a collection of computing devices and other hardware to provide connections and carry communications. Devices 202*a* and 202*b* may include any computing device such as include a mobile device, cellular phone, smartphone, smartwatch, activity tracker, tablet computer, next generation portable device, handheld computer, notebook, laptop, projector device (e.g., three-dimensional holographic or hologram projector), or virtual reality or augmented reality device. Devices 202*a*, 202*b* may include processor 206 that executes program 210. Devices 202*a*, 202*b* may include memory 208 that stores system operational information and program 210. Devices 202*a*, 202*b* may include transceiver 212 that communicates system operational information between any of devices 202*a*, 202*b*, server 205, and database 222. System operational information may include but is not limited to hardware setting parameters, calibration information, deep-learning heuristics, as well as accumulated data for a screening event where system 200 is deployed for security or other screening purposes, as examples.

Server 205 may include any computing system. Server 205 may generate by processor 206 executing program 210 and store by memory 206, e.g., system operational information. Server 205 may further generate and store a user profile for user 201, or other information such as conditions of a screening event and notes indicated by user 201. Server 205 may communicatively connect with and transfer information with respect to devices 202*a*, 202*b*, and database 222. Server 205 may be in continuous or periodic communication with devices 202*a*, 202*b*, and database 222. Server 205 may include a local, remote, or cloud-based server or a combination thereof and may be in communication with and provide system operational information (e.g., as part of memory 208 or database 222) to any or a combination of devices 202*a*, 202*b*. Server 205 may further provide a web-based user interface (e.g., an internet portal) to be displayed by user interface 214. Server 205 may communicate system operational information with devices 202*a*, 202*b* using a notification including, for example automated phone call, short message service (SMS) or text message, e-mail, http link, web-based portal, or any other type of electronic communication. In addition, server 205 may be configured to store system operational information as part of memory 208 or database 222. Server 205 may include a single or a plurality of centrally or geographically distributed servers. Server 205 may be configured to store and coordinate system operational information with and between any of devices 202*a*, 202*b*, network 220, and database 222.

User interface 214 of devices 202*a*, 202*b* may include any user interface device, display device, or other hardware mechanism that connects to a display or supports user interfaces to communicate and present system operational information throughout system 200. Any of the inputs into and outputs from user interface 214 may be included as system operational information. User interface 214 may include any input or output device to facilitate receipt or presentation of information in audio, visual or tactile form or a combination thereof. Examples of a display may include, without limitation, a touchscreen, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, projector device, and the like. The user interface 214 may present guidance information to any user of devices 202*a* and 202*b*.

Connections 224 may be any wired or wireless connections between two or more endpoints (e.g., devices or systems), for example, to facilitate transfer of information. Connection 224 may include a local area network, for example, to communicatively connect the devices 202*a*, 202*b*, with network 220. Connection 224 may include a wide area network connection, for example, to communicatively connect server 205 with network 220. Connection 224 may include a wireless connection, e.g., radiofrequency (RF), near field communication (NFC), Bluetooth communication, Wi-Fi, or a wired connection, for example, to communicatively connect the devices 202a, 202b and other components of system 200.

Any portion of system 200, e.g., devices 202a, 202b, and server 205, may include a computing system and/or device that include processor 206 and memory 208. Computing systems and/or devices generally include computer-executable instructions, where the instructions may define operations and may be executable by one or more devices such as those listed herein. Computer-executable instructions may be compiled or interpreted from computer programs created using a variety of programming languages and/or technologies, including, without limitation, and either alone or in combination, Java language, C, C++, Visual Basic, Java Script, Perl, SQL, PL/SQL, Shell Scripts, Unity language, etc. System 200, e.g., devices 202a, 202b, and server 205 may take many different forms and include multiple and/or alternate components and facilities, as illustrated in the Figures. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., devices 202a, 202b, and server 205) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac® OS X and iOS operating systems distributed by Apple Inc. of Cupertino, California, the BlackBerry® OS distributed by Research In Motion of Waterloo, Canada, and the Android operating system developed by the Open Handset Alliance. Examples of computing systems and/or devices such as devices 202a, 202b, and server 205 may include, without limitation, mobile devices, cellular phones, smart-phones, super-phones, next generation portable devices, mobile printers, handheld or desktop computers, notebooks, laptops, tablets, wearables, virtual or augmented reality devices, secure voice communication equipment, networking hardware, computer workstations, or any other computing system and/or device.

Further, processors such as processor 206 receive instructions from memories such as memory 208 or database 222 and execute the instructions to provide the operations herein, thereby performing one or more processes, including one or more of the processes described herein. Such instructions and other guidance information may be stored and transmitted using a variety of computer-readable mediums (e.g., memory 208 or database 222). Processors such as processor 206 may include any computer hardware or combination of computer hardware that is configured to accomplish the purpose of the devices, systems, operations, and processes described herein. For example, processor 206 may be any one of, but not limited to single, dual, triple, or quad core processors (on one single chip), graphics processing units, and visual processing hardware.

A memory such as memory 208 or database 222 may include, in general, any computer-readable medium (also referred to as a processor-readable medium) that may include any non-transitory (e.g., tangible) medium that participates in providing guidance information or instructions that may be read by a computer (e.g., by processors 206 of devices 202a, 202b, and server 205). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Further, databases, data repositories or other guidance information stores (e.g., memory 208 and database 222) described herein may generally include various kinds of mechanisms for storing, providing, accessing, and retrieving various kinds of guidance information, including a hierarchical database, a set of files in a file system, an application database in a proprietary format, a relational database management system (RDBMS), etc. Each such guidance information store may generally be included within (e.g., memory 208) or external (e.g., database 222) to a computing system and/or device (e.g., devices 202a, 202b, and server 205) employing a computer operating system such as one of those mentioned above, and/or accessed via a network (e.g., system 200) or connection in any one or more of a variety of manners. A file system may be accessible from a computer operating system, and the file system may include files stored in various formats. An RDBMS generally employs the Structured Query Language (SQL) in addition to a language for creating, storing, editing, and executing stored procedures, such as the PL/SQL language mentioned above. Memory 208 and database 222 may be connected to or part of any portion of system 200.

Figure 3A:
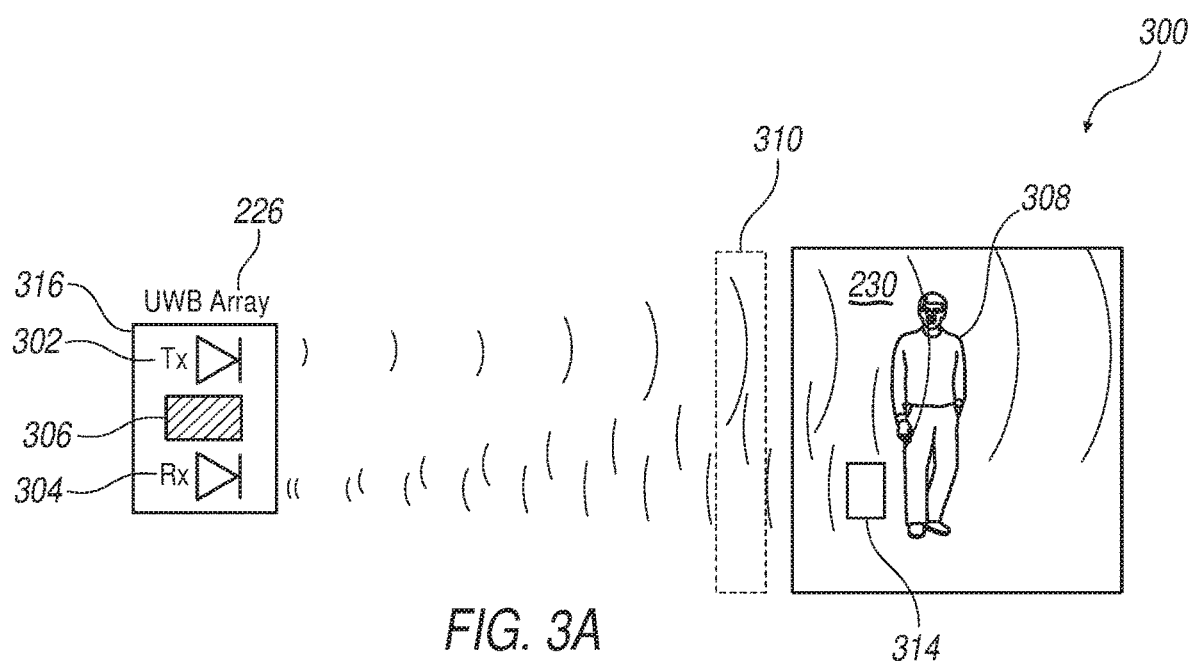
FIG. 3A illustrates a basic hardware configuration of the exemplary system of FIG. 2, without the presence of an object-of-interest (OOI)
Figure 3B:
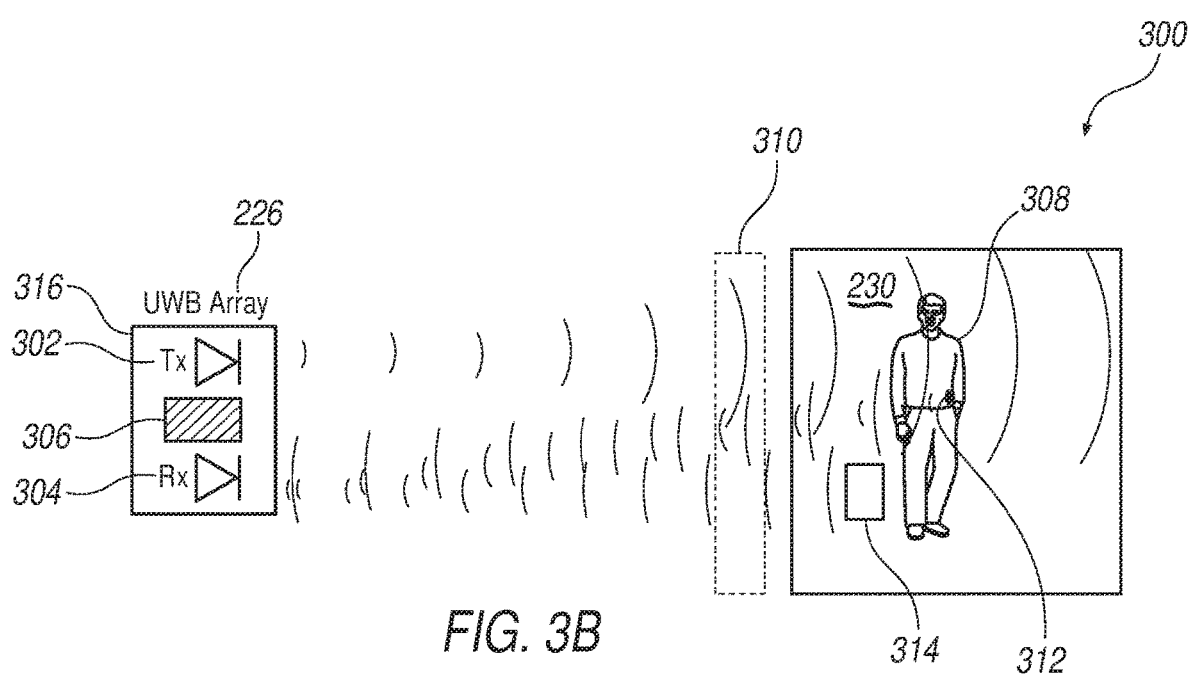
FIG. 3B illustrates the basic hardware configuration of FIG. 3A, with the presence of an OOI.

FIGS. 3A and 3B illustrate a basic hardware layout or configuration 300 of the exemplary system of FIG. 2, with corresponding elements. FIGS. 3A and 3B illustrate use of configuration 300, with FIG. 3A illustrating the presence of an individual without an OOI, and FIG. 3B illustrating an individual with an OOI. FIGS. 3A and 3B correspond to use of ROI 230 for both a training session or calibration of system 200 and its pattern recognition data, and as describe above at step 106, and for obtaining scanning data, step 108 above, for recognizing the presence of defined OOI pattern data such as in step 118 after comparison of the scanned data with calibration data.

Configuration 300 includes UWB transmitter array 226 connected to network 220 via connections 224 as described above, and UWB transmitter array 226 includes DC power 232 (as illustrated in FIG. 2). As indicated, configuration 300 includes one UWB transmitter array 226, but it is contemplated that a plurality of one or more UWB transmitter arrays 228 may be included, and certain additional advantages may be derived from a system having more than one UWB transmitter array 226.

UWB transmitter array 226 includes a transmitter 302 "TX" device (or antenna), a receiver 304 "RX" device (or antenna), and a pre-processor 306. Configuration 300 includes ROI 230, which may be a hallway, a room in a building having walls, an open or semi-enclosed area, or a defined walkway that is used to control movement of people for scanning purposes, as examples. One or more people 308 present within ROI 230 may be overtly scanned having UWB transmitter array 226 visibly present and proximate ROI 230. Or, people 308 may be covertly scanned by having a physical barrier 310 or other items positioned between ROI 230 and UWB transmitter array 226. Physical barrier 310 may be any material that is opaque, such as a drywall or wooden wall, or a concrete or brick barrier. Physical barrier 310 may also be a window or other material that may be transparent or reflective. In any case, physical barrier 310 may be present to obscure the presence of UWB transmitter array 226, or physical barrier 310 may be simply a dividing barrier that enables people 308 to visibly see UWB transmitter array 226. If present, physical barrier 310 is a material that may be semi-transparent to emissions to and from UWB transmitter array 226. In one example, the ROI includes a walkway that is bounded to prevent the human individuals from avoiding the ROI.

Broadband as well as raw data streams pass to and from UWB transmitter array 226. In operation, subjects to be screened, or one or more people 308, pass proximate UWB transmitter array 226, and when within ROI 230 an event is triggered. UWB transmitter 302 emits short duration low energy (less than 200 microwatts) pulses over a large bandwidth, and broadband and RF data is captured by receiver 304 at 40 frames per second. Event data is pre-processed in a custom pipeline and via pre-processor 306 with one or more filters (e.g., bandpass), background subtractions, and other methods to remove extraneous signals. Event data processed may be of both person 308 potentially carrying a weapon 312 or OOI, as well as multipath signals (i.e., instead of a direct reflection off of a target, may be an additional object 314 that is in a reflection path from weapon 312 or person 308). In one example, the ROI includes a walkway that is bounded with object 314 to prevent the human individuals from avoiding the ROI. And, object 314 represents any object that may form part of the ROI and a signature of that item or items is formed when calibration of the ROI occurs. As indicated, the environment or ROI where calibration occurs may itself change while screening individuals against a calibrated background. When in use and while screening occurs, the ROI may change due to movement of an item within the ROI, such as movement of a background item such as a garbage can or other item or items that form a background signature. Thus, unlike a typical scanner that scans individuals against a known background (such as in a walk-through scanner for metal or x-ray detection), the system allows for a dynamic and changing environment that may change with time. As objects, such as object 314, change within the ROI, scanning may be temporarily halted in order that the ROI may be re-calibrated to account for the different background or ROI information.

Event data is passed via connections 224 to network 220 and to processor 206 having the pattern recognition device. Analysis hardware may be a locally present computer or server, such as server 205 of FIG. 2, and/or data may be further transmitted to one or more devices that may or may not be local to configuration 300. In one example, a local computer such as server 205 may be present to perform the more computationally intensive work, accessing a local or remotely located database 222. Results of the analysis may be transmitted via connections 224 to devices 202a, 202b, used for monitoring an ongoing screening procedure.

In one example, UWB transmitter array 226 may operate having up to a 10-meter range to ROI 230. It is contemplated, however, that any range may be employed such that an ROI may be established through which an individual passes, and OOI and individual pattern data may be distinguished. The disclosed configuration 300 provides the ability to detect objects, such as weapon 312 on person 308, through walls, clothing, bags, luggage, and the like, with very low loss of signals through common materials such as drywall, glass, and the like. In one example the system provides 1 mm resolution or less in object identification. Furthermore, it is contemplated that individuals carrying concealed weapons may have a unique and identifiable gait when passing through ROI 230, which can itself be identified, and according to patterns identified in the scanned data, for identifying possible presence of a weapon. In addition, although item 312 is described as a weapon that may be concealed, any item(s) or OOI patterns may be identified. For instance, contraband such as illicit drug paraphernalia or other items such as ammunition for a weapon may likewise be identified, or speech or facial recognition as well.

In one example, UWB transmitter array 226 uses a 7.3 GHz center frequency with a 1.5 GHz bandwidth. Differential RF terminals are used for low noise and distortion, yielding high sensitivity in both static and dynamic applications. In general, the disclosed device utilizes very low power levels significantly below Federal Communications Commission (FCC) Class B limits for electronic devices designated for residential space, enabling its use in most worldwide markets. In one example, bi-phase, or binary phase, coding is used for transmitting pulses for spectrum spreading. Also, a master/slave Serial Peripheral Interface (SPI) is employed, where a synchronous serial communication interface is used for short-distance communication, with Quad SPI mode employed for higher data rates. Digital down-conversion converts digitized, band limited signal to a lower frequency signal and at a lower sampling rate, and further filtering may be applied.

A small footprint Chip Scale Packaging is used for high density integration. In one example, a 3"×1.5"×0.375" board is used having low power requirements to facilitate battery operation of UWB transmitter array 226. An impulse Radar Transceiver System on a Chip (SoC) is used with a commercially available UWB chip. The radar chips are mounted on a development board 316 along with pre-processor 306, as well as transmit and receive devices 302, 304.

Figure 4:
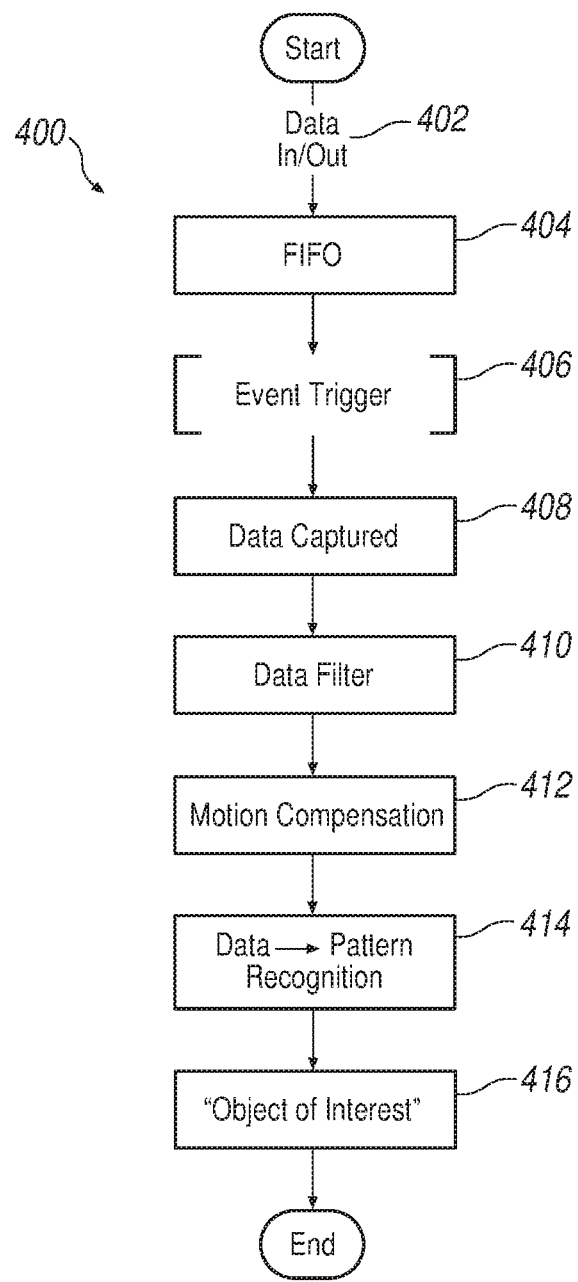
FIG. 4 illustrates steps followed for object-of-interest (OOI) pattern recognition.

FIG. 4 illustrates steps 400 used by system 200 and passed via connections 224 for OOI pattern prediction. Generally, data analysis using pattern recognition may take place at a local server, such as server 205 and using database 222. Data report-out, including statistical information, system performance, positive hits, and the like, may be reported out to user 201 to devices 202a and 202b. Thus, security screening may take place with user 201 who, in one example, may be removed from ROI 230, with system 200 operating in a stand-alone fashion and without human direct monitoring. It is further contemplated, however, that the disclosed system may be used in conjunction with other known screening systems, such as metal detectors or other screening devices, as well.

At step 402 data passes in and out of UWB array 226. A first-in and first-out (FIFO) buffer is employed at step 404 to gather and monitor data until an event trigger occurs at 406. An event trigger occurs when, for instance, the learning environment defined in ROI 230 is disrupted by passage of a person or individual such as one of persons 308. RF and broadband data are captured at step 408, and the data is filtered at step 410 using pass and other known filters to remove background, and the like. Motion compensation is applied at step 412, and factors are determined or calculated and applied to account for gait and stride artifacts. Processed data is then fed to a pattern recognition heuristic at step 414, and the data is contrasted with previously obtained 'ground truth' data patterns, and an object-of-interest prediction is made at step 416. That is, the previously obtained 'prediction function' is used to identify possible OOIs via their OOI patterns, based on the learning performed as discussed in method 100 above. The process ends, and control continually passes back to the start at step 106 and monitoring continues until another event trigger occurs at step 406.

Figure 5:
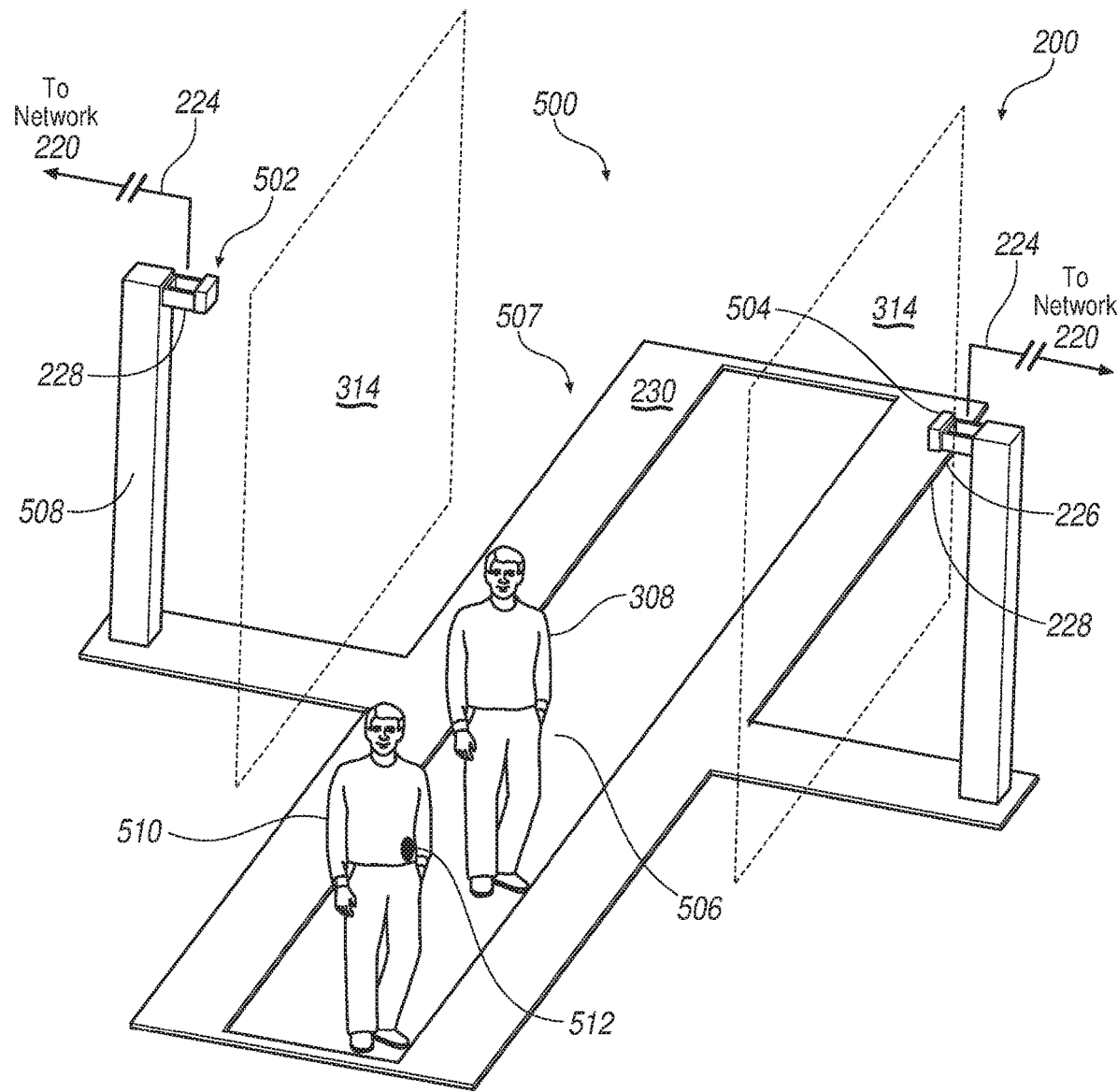
FIG. 5 illustrates an exemplary system and configuration that benefits from the disclosed subject matter.

Individual screening may be performed using a designated walkway, for example. Referring to FIG. 5, system 200 may be deployed in a configuration 500 as illustrated. Configuration 500 includes a first radar array 502, corresponding with UWB transmitter array 226 described above. Configuration 500 may also include a second UWB transmitter array or additional arrays, 504, which may correspond with UWB transmitter arrays 228. Arrays 502, 504 may be positioned about a walkway 506 and mounted on supports or stanchions 508. Radar arrays 502, 504 are positioned to emit UWB pulses toward a region-of-interest (ROI) 507. In one example, UWB transmitter array(s) 504 may be positioned and concealed by a barrier, such as barrier 310 as described above and illustrated in FIG. 5.

Once deployed, system 200 is engaged in a training process such that the disclosed system can properly predict the presence of OOI patterns, or objects-of-interest. More specifically, because any environment where system 200 is to be set up, it may be in an environment that has not been previously used for scanning purposes. Thus, as discussed with respect to FIG. 1, a prediction function or calibration step is performed and as discussed at step 104 above. The training process includes activation of the system and acquisition of data by training system 200 to identify individuals with OOI patterns and individuals without OOI patterns. Once set up, system 200 may be trained with the particular configuration 500 to identify OOI patterns by using walkway 506 and configuration 500 as a learning environment. For instance, if being set up for screening people for possible handguns, then a 'ground truth' is determined by employing the two steps described above at step 106. That is, 'ground truth' may be established for the two primary conditions:

1) a weapon or object-of-interest (OOI) is present on an individual;
2) the individual is not carrying a weapon or object of interest.

As such, a resultant 'training set' of data is established that includes the two primary data sets, one that includes a first set of OOI data that may include a weapon, and a second set that does not include OOI data.

Once trained, and as also described with respect to FIGS. 3A and 3B, system 200 using configuration 500 is ready for going 'live' to screen individuals for OOI, via obtained OOI patterns, according to the criteria established in step 104 above. Input data is then obtained by scanning using first radar array 502, and if present, second or additional radar arrays 504. As individuals pass along walkway 506, individuals are detected and identified as individuals not meeting the pattern recognized as OOI, and based on the training set and the activation of the computing system. Scanning continues until an individual, such as an individual 510 having a pattern reflective of a weapon or handgun 512, is identified as an OOI pattern in step 118. And, as indicated, OOI pattern identified as item 512 is not limited to any particular model or type of handgun, but because of the pattern recognition capabilities and calibration performed previously, OOI and their pattern may then be detected that is any type of handgun, in the example when step 104 was performed using the OOI pattern as a handgun.

As such, data is obtained and pre-processed using for instance pre-processor 306, and such as at step 106. The obtained and pre-processed data is mapped against the model obtained and pattern recognition thereby identifies a pattern corresponding to the OOI pattern after any post-processing of data. As appropriate, a prediction is made regarding any patterns that indicate the presence of the OOI pattern. Resultant data and statistics may be monitored and reported. For instance, although heavy processing and implementation may be performed on server 105, monitoring results, statistics, and the like, may be reported out to other users or monitors to, for instance, devices 202a and/or 202b.

Figure 6:
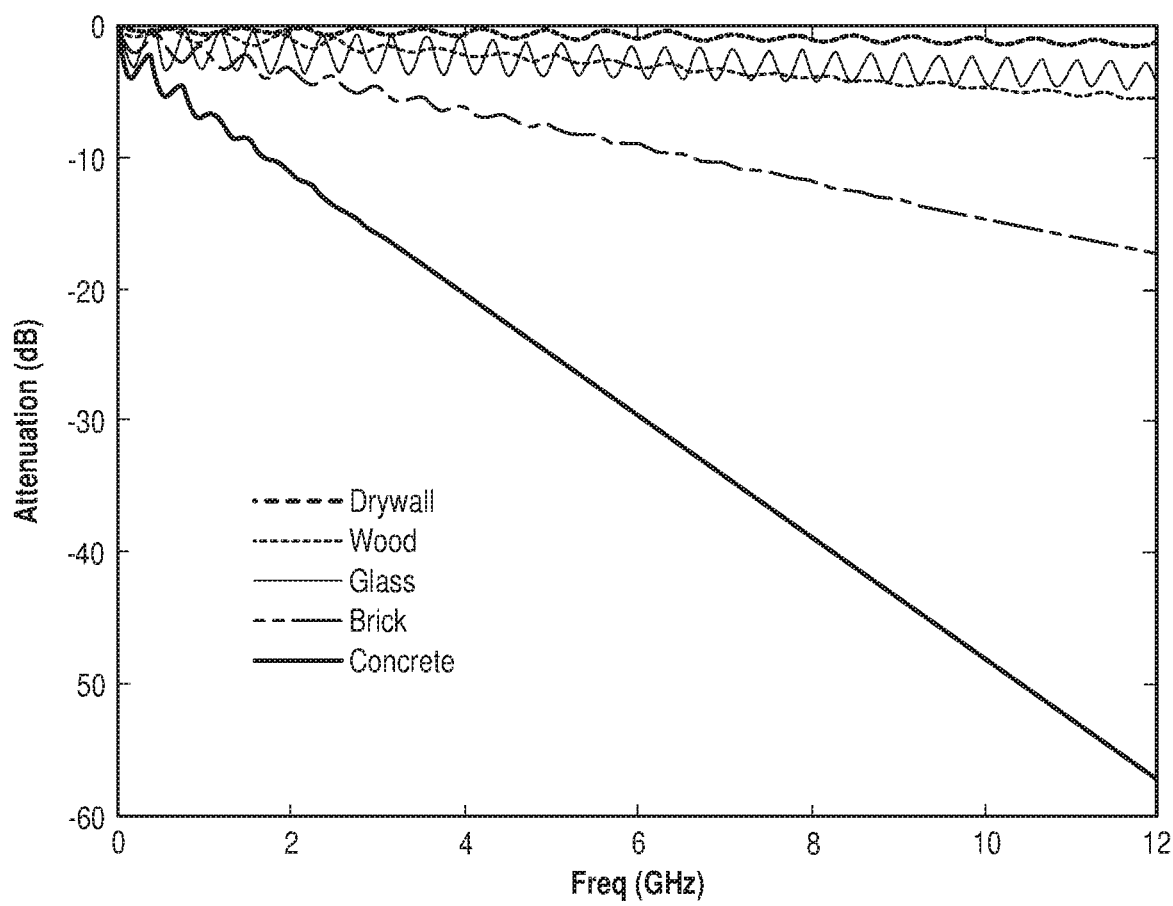
FIG. 6 illustrates exemplary attenuation data for various materials that may form a barrier.

Referring to FIG. 6, exemplary normalized attenuation data is shown for various materials that may form a barrier, such as barrier 310. Barrier materials may be used to form a physical barrier to prevent accidental or intentional abuse to components of system 200, or to disguise or mask the presence of system components such as UWB transmitter array 226 in a covert screening arrangement. As can be seen, nominal thicknesses may be used for barrier 310, such as drywall, wood, and glass. As may be expected, brick and concrete present increased attenuation characteristics, so must be accounted for when establishing a configuration of system 200.

Figure 7:
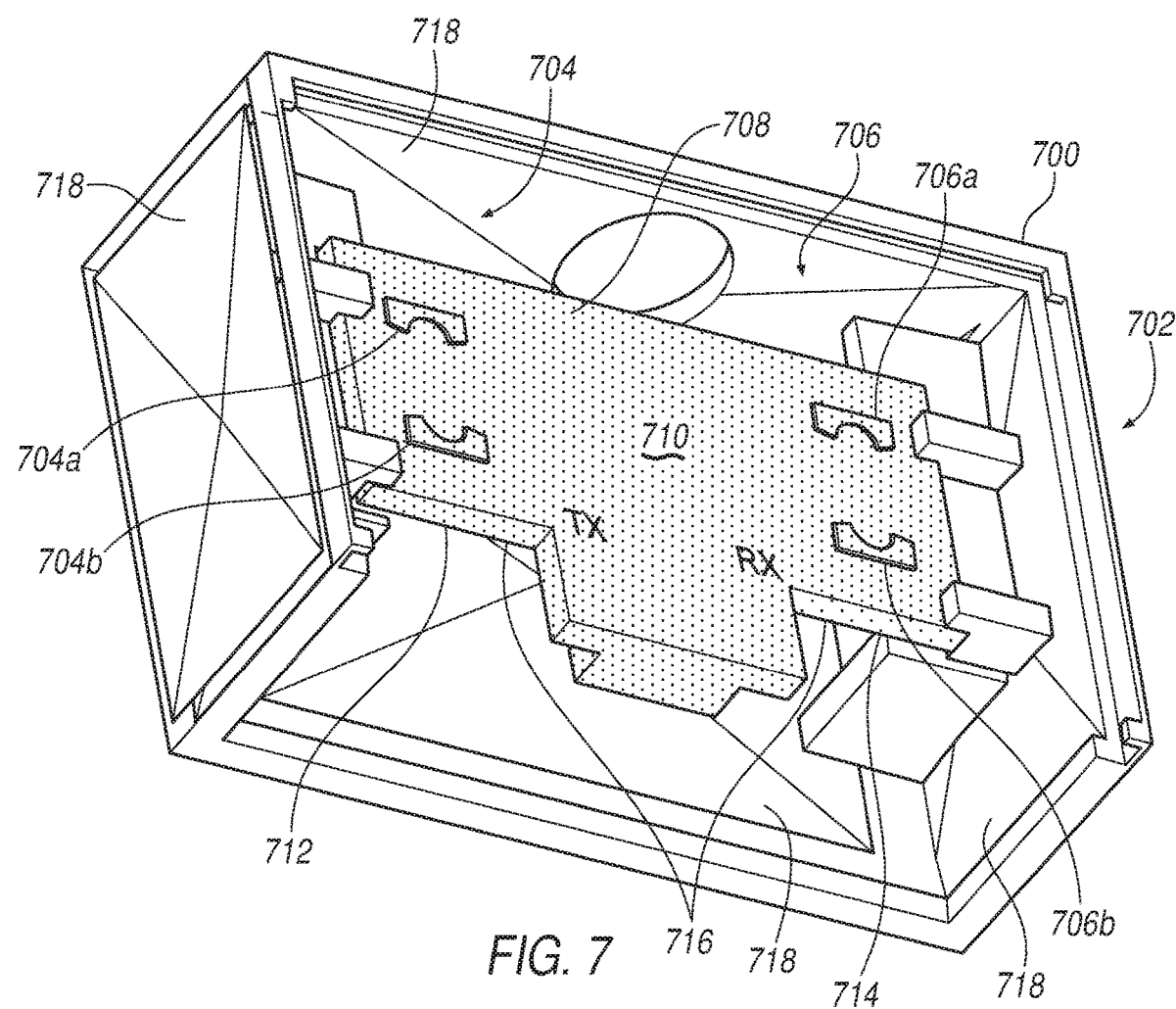
FIG. 7 illustrates an enclosure that houses or encloses a UWB transmitter array.

Referring to FIG. 7, an enclosure 700 (a portion of which is shown) is illustrated that houses or encloses a UWB transmitter or transmitter array 702, corresponding generally with UWB transmitter array 226 as previously discussed. UWB transmitter array 702 includes a transmitter 704 "TX" device (or antenna), a receiver 706 "RX" (or antenna), both coupled to a base support 708 (i.e., development board 316 as previously described that may include a pre-processor, not shown in FIG. 7, such as pre-processor 306) in this example. Each of transmitter 704 and receiver 706 is illustrated as having two corresponding elements, but for the sake of the disclosure and for discussion herein, each is referred to in the singular. For example, transmitter 704 includes elements 704a and 704b, both of which correspond generally with transmitter 704. Likewise, receiver 706 includes elements 706a and 706b, both of which correspond generally with receiver 706. Base support 708 is positioned within enclosure 700 and provides a structural support for both the transmitter 704 and the receiver 706, while also providing attachment to enclosure 700 to secure base support 708.

In operation and as discussed above, broadband and raw data streams pass to and from UWB transmitter array 226. Transmitter 704 emits pulses and broadband and RF signals are captured by receiver 706. Transmitter 704 is generally a directional antenna directs its emissions toward an intended target, as illustrated in FIGS. 3A and 3B.

Figure 8:
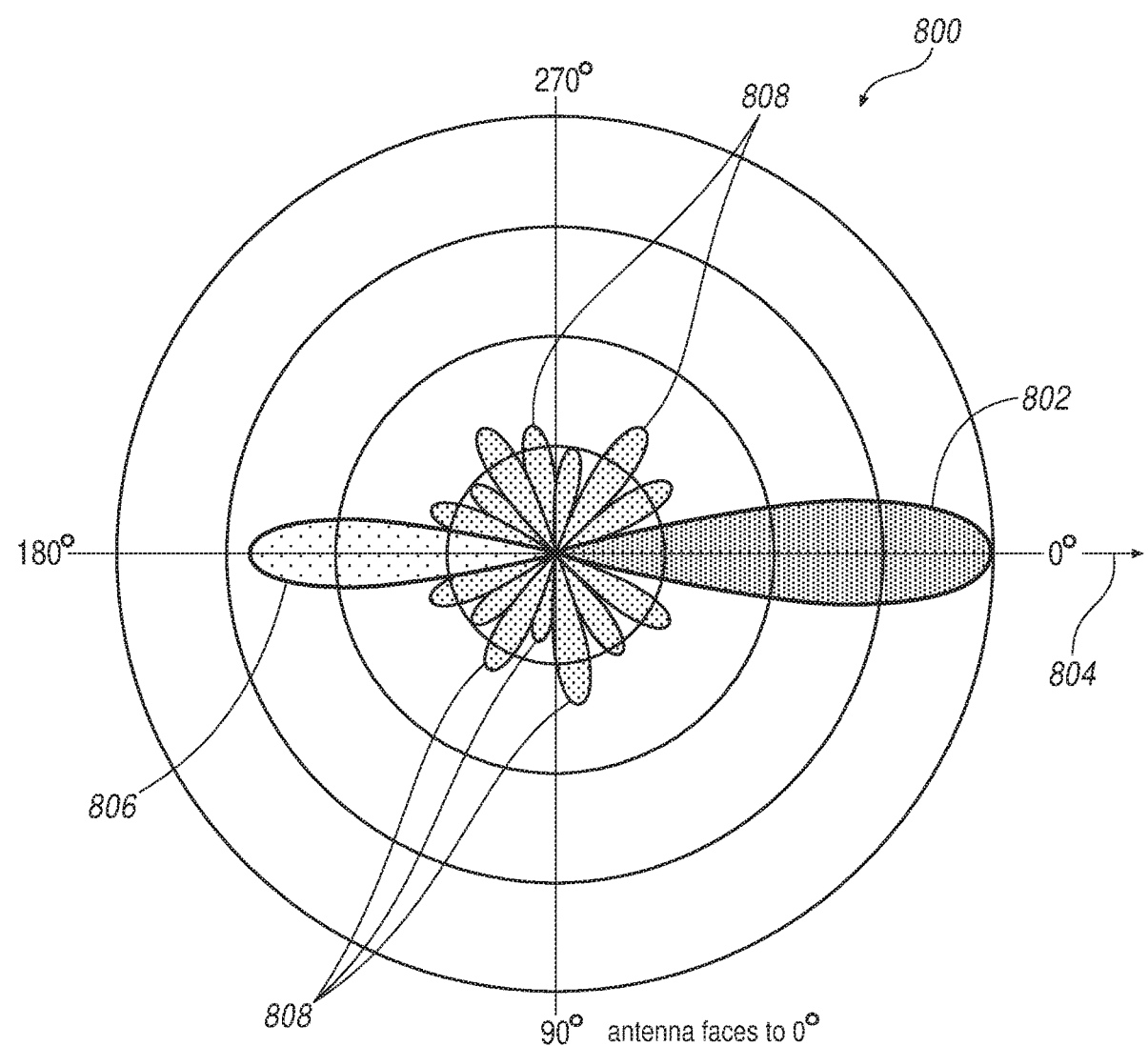
FIG. 8 is a graphical illustration of a main lobe, back lobe, and side lobes for an ultra-wideband (UWB) transmitter.

Referring to FIG. 8, a 360° two-dimensional (2D) illustration 800 includes a main lobe 802 emits from transmitter 704 and corresponds with 0° in the 2D illustration 800 and is directed 804 toward the intended target. A back lobe 806 is generally emitted at 180° opposite main lobe 802, and back lobe 806 is typically of less intensity or magnitude as main lobe 802. Side lobes 808 emit also from transmitter 704 and at off-angles between main lobe 802 and back lobe 806. And, although represented as a 2D emission, it is contemplated that emission may be in other "off planar" directions and is generally not limited to only 2D.

Thus, during operation of transmitter 704, main lobe 802 provides the principle emission toward the ROI, and reflected energy from objects in the ROI is returned to receiver 706 and processed. Generally, therefore, emission from main lobe 802 is impinged upon a target and reflections from the target are received as a desired signal at receiver 706. This desired signal is processed in accordance with the above discussion to detect an OOI.

However, in general the desired signal used to detect the OOI can be swamped with extraneous electrical noise, and a certain threshold of signal-to-noise (SNR) ratio is desired to properly operate the UWB system. Such noise may come from sources outside of the UWB system and can make OOI identification difficult.

Other sources of electrical noise may be present, as well. For instance, if an object is within the direction of back lobe 806 or side lobes 808, a portion of the energy from these lobes 806, 808 may be reflected back to the antennas, such as receiver 706. That is, in application if an object is inside where either of the lobes 806, 808 is directed, a portion of the energy is reflected back to the antennas, or in this example the illustrated receiver element 706a, 706b. This reflected energy manifests as noise and therefore can decrease the signal-to-noise ratio (SNR), as the SNR can be depressed. Mitigation of the decreased SNR is an object of the present disclosure. In one example and as will be further discussed, radar absorbing materials may be positioned to absorb at least a portion of the back and side lobe emitted energy. In another example, walls of the housing or enclosure 700 can also result in reflection directly back from walls of the enclosure to the UWB transmitter array, and particularly to receiver 706. According to the disclosure, the absorbing materials are filler materials which absorb electromagnetic energy, converting it into very low levels of heat. The fillers are mixed into a binder material, typically an elastomeric or foam-based product, facilitating production of the absorber into sheet and other shaped products. The disclosed system therefore also includes radar absorbing materials positioned to both receive electromagnetic waves transmitted from the transmitter component that are not directed toward the ROI as well as waves incident on the receive antenna not from the ROI direction, and a pattern recognition device having a processor configured to process the electromagnetic waves reflected from the ROI and to determine whether an object-of-interest (OOI) pattern is recognized within the object data.

According to the disclosure, radar absorbing materials may be used to absorb at least a portion of the back and side lobe energy corresponding with back lobe 806 and side lobes 808. Thus, electrical noise resulting from enclosure 700 is mitigated. In general, referring to FIG. 9 in illustration 900, an incident wave 902 falls upon a radiation absorbing material (RAM) 904. Incident wave 902 passes as transmitted wave 906 and is absorbed, to a degree, when passing through RAM 904, resulting in a transmitted wave 908 that is significantly reduced in intensity from that of incident wave 902. A portion of incident wave 902 is reflected at a first surface 910 as reflected wave 912. Likewise, a portion of transmitted wave 906 is reflected at a second surface 914 and an absorbed wave 916 passes back through RAM 904 where the wave again passes as a re-reflected wave 918 or as a second reflected wave 920. Re-reflection, absorption, and internal re-reflection occurs until the wave is ultimately diminished.

Figure 9:
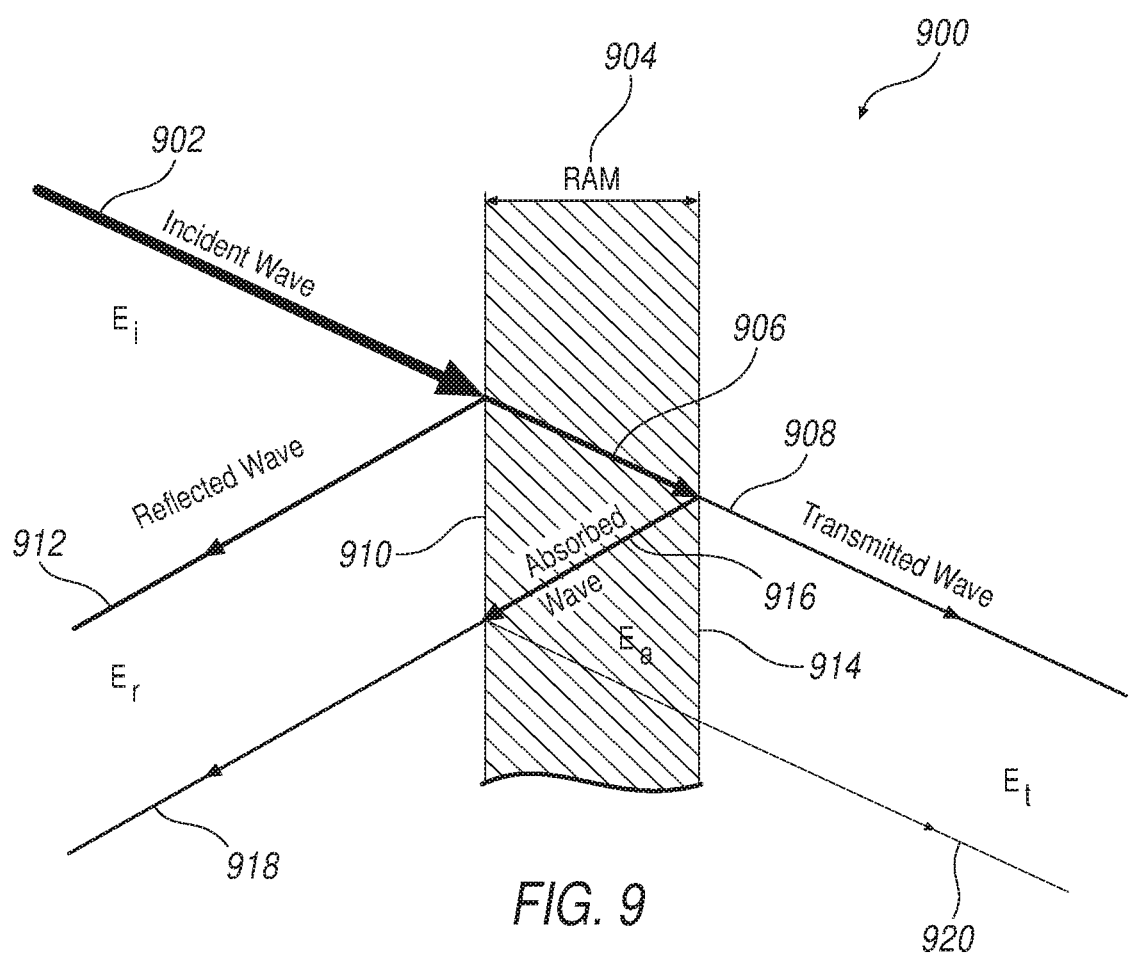
FIG. 9 is a graphical illustration of an incident wave on a radiation absorbing material (RAM) and its reflected and transmitted characteristics.

Thus, FIG. 9 depicts RAM 904 that is an electromagnetic absorbing material having, in one example, a thickness of 0.89 mm (0.035"). Thickness is determined by the frequency of interest and in this example a frequency range of 5-9 GHz, corresponding to the selected thickness. In this application an elastomeric binder is used and having a ground plane bonded to a base absorbing material.

Figure 10:
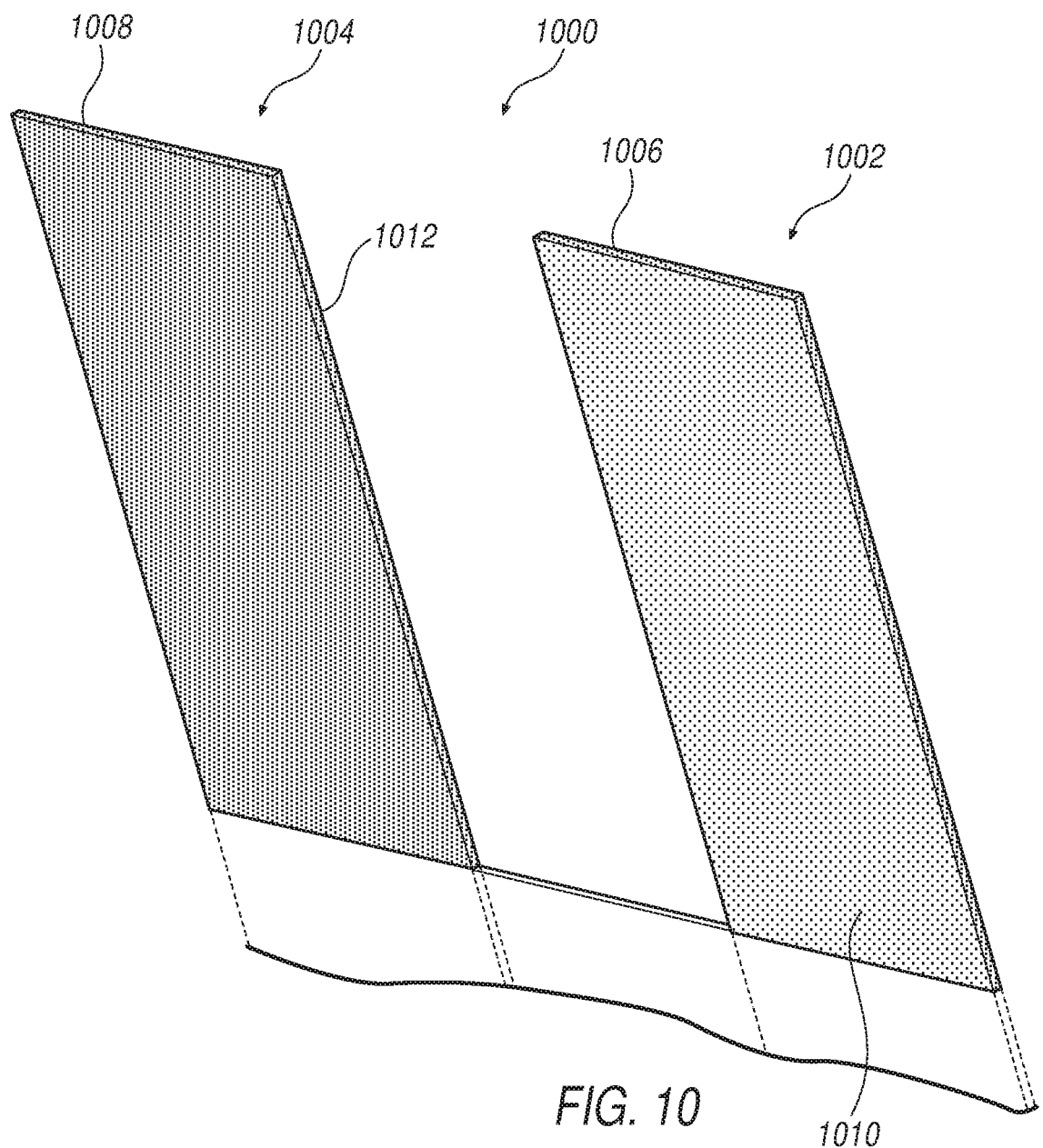
FIG. 10 is an illustration of a first radiation absorber and a second absorber that are laterally offset from one another.

For instance, referring to FIG. 10, illustration 1000 shows a first absorber 1002 and a second absorber 1004 that are laterally offset from one another. Each of first absorber 1002 and second absorber 1004 includes a central or core absorbing material 1006, 1008, respectively, and each includes a ground plane 1010, 1012, respectively, attached thereto. That is, first absorber 1002 includes absorbing material 1006 and having first ground plane 1010 attached thereto on one side (on the front side in the illustration) of first absorber 1002. Second absorber 1004 includes absorbing material 1008 and having second ground plane 1012 attached thereto (on the back side in the illustration). Thus, according to the disclosure first and second absorbers 1002 and 1004 are positioned having an orientation opposite one another, as it is desirable to have first and second ground planes 1010 and 1012 positioned appropriately with respect to any incoming wave as will be further illustrated.

Referring back to FIG. 7, transmitter 704 and receiver 706 are illustrated on a front side 710 of transmitter array 702. Transmitter 704 is positioned on a first wing 712 and on front side 710 of transmitter array 702, and receiver 706 is positioned on a second wing 714 and also on front side 710 of transmitter array 702. Transmitter array 702 includes a back side 716.

Figure 11:
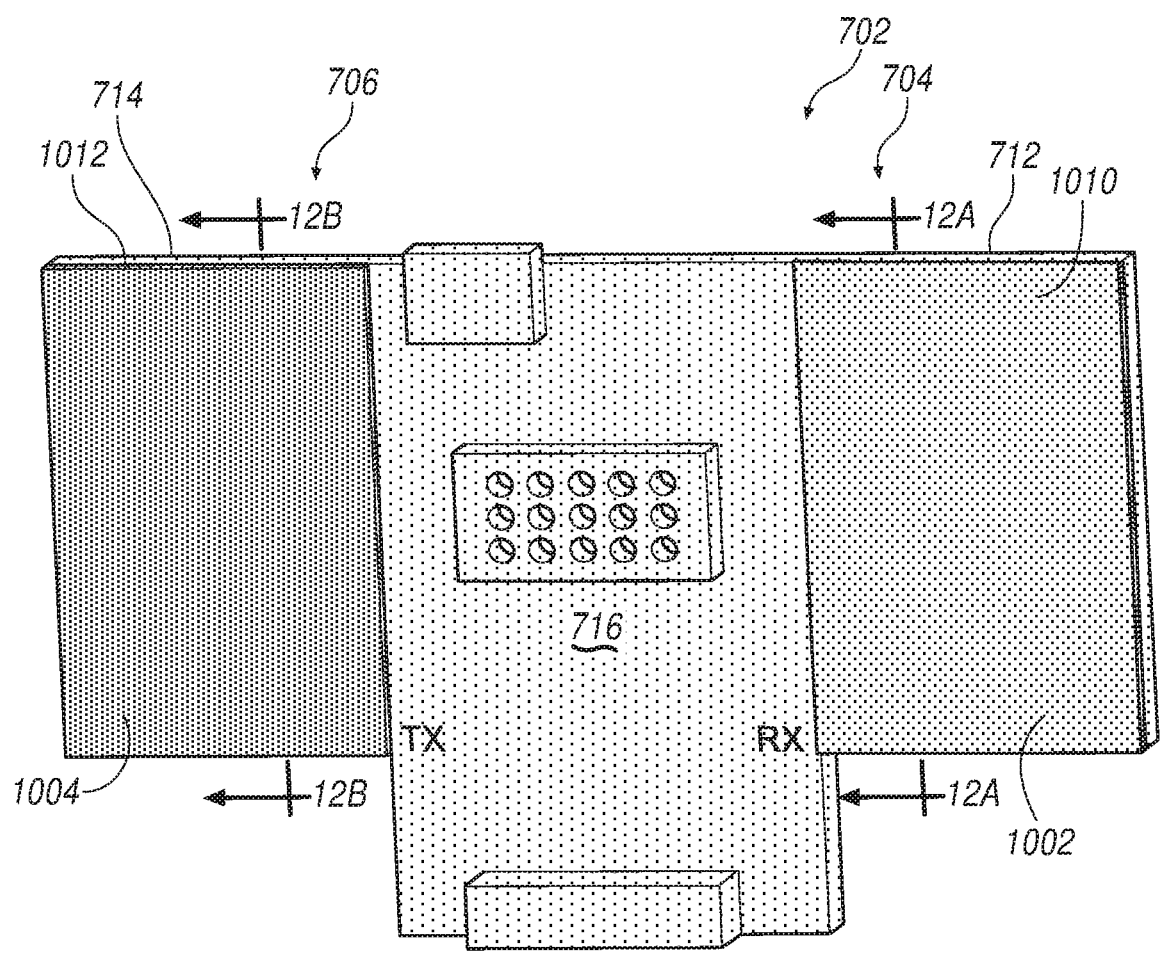
FIG. 11 is an illustration of a transmitter from its back side.

FIG. 11 shows transmitter array 702 of FIG. 7 from a back side (and not showing additional structural elements for illustration purposes only). First wing 712 includes transmitter 704, with transmitter components 704a and 704b being positioned on the front of transmitter array 702, and therefore not visible in FIG. 11. Likewise, second wing 714, includes receiver 706, with receiver components 706a and 706b being positioned on the front of transmitter array 702, and therefore also not visible in FIG. 11. As such, back side 716 of transmitter array 702 is visible in FIG. 11. FIG. 11, however, further includes first absorber 1002 positioned on back side 716 of first wing 712, and includes second absorber 1004 positioned on back side 716 of second wing 714.

Figure 12A:
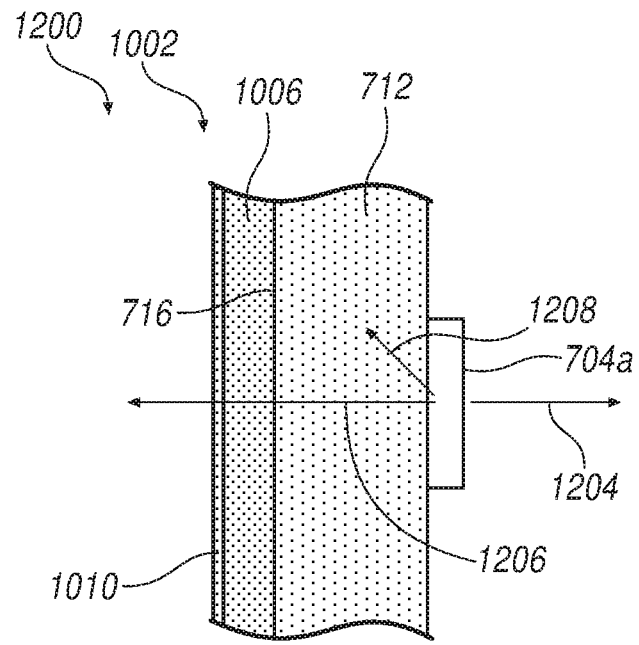
FIGS. 12A and 12B show exemplary paths of transmitted and reflected emissions passing through absorber materials and respective locations of ground planes.
Figure 12B:
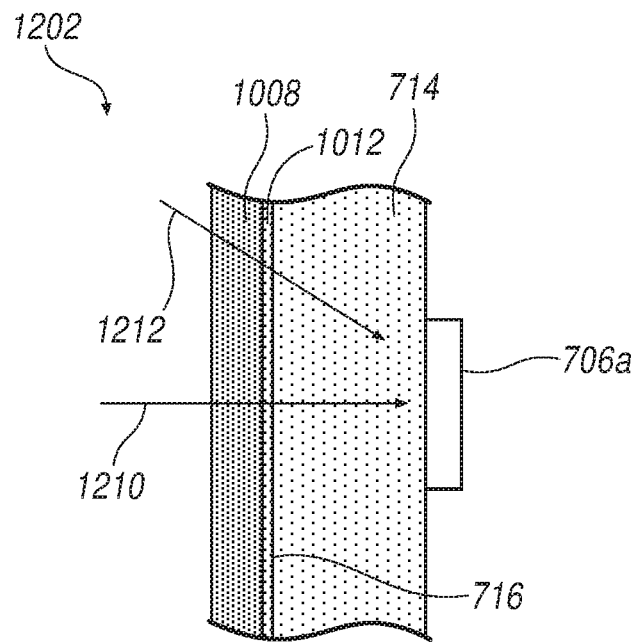

According to the disclosure and in one example, ground planes of the absorbers are positioned on their respective absorbing materials so as to be positioned away from any incoming wave that is to be attenuated, as further illustrated in FIGS. 12A and 12B. FIG. 12A shows a transmitter illustration 1200 having transmitter element 704a, as an example, positioned on first wing 712. First absorber 1002 is positioned on back side 716, and first absorber 1002 includes first absorbing material 1006 and ground plane 1010 positioned thereon. FIG. 12B shows a receiver illustration 1202 having receiver element 706a, as an example, positioned on second wing 714. Second absorber 1004 is positioned on back side 716, and second absorber 1004 includes second absorbing material 1008 and ground plane 1012 positioned thereon. Thus, first ground plane 1010 and second ground plane 1012 are in opposite orientations with respect to their respective first and second wings 712, 714.

In operation and as discussed with respect to FIG. 8, transmitter 704 includes main lobe 802, back lobe 806, and side lobes 808. In FIG. 12, main lobe 802 therefore corresponds with emission from transmitter element 704a in direction 1204, back lobe 806 corresponds with direction 1206, and side lobes 808 emit in off-directions and as illustrated in one exemplary direction 1208. The back and side lobe emissions, as discussed, can result in undesirable noise after having been reflected from walls within the enclosure in which transmitter array 702 is positioned. As such, first absorber 1002 is positioned to intercept and attenuate both back lobe 806 and side lobes 808 from passing to walls of the enclosure. And, as illustrated, first ground plane 1010 is positioned on a surface positioned away from first absorber 1002. That is, emissions from transmitter element 704a first pass through first absorbing material 1002 and then through first ground plane 1010.

Also in operation and as discussed, emissions may also be reflected from walls of the enclosure. Thus, although undesirable back lobe and side lobe emissions are attenuated and as discussed with respect to FIG. 12A, some emissions nevertheless pass the surrounding enclosure and are reflected back. Referring to FIG. 12B, reflected waves may reflect in directly back from the wall of the enclosure, such as in direction 1210 (which may be due to back lobe emission of direction 1206), or may be off-directional 1212 due to reflections from exemplary direction 1208. As such and as discussed, emissions in directions 1210 and 1212 are directed toward receiver element 706a by first passing through second absorbing material 1008 of second absorber 1004 before passing to second ground plane.

Thus, according to the disclosure, absorbing materials are positioned such that any undesirable emissions first pass through the absorbing materials themselves, and then through their corresponding ground plane. Further, it is contemplated that the ground planes discussed herein may be left to float electrically and not electrically connected to any additional grounding or to a bias voltage. However, it is contemplated that the ground planes may be grounded to earth, grounded to other devices, or grounded to each other. It is further contemplated that the ground planes may be biased electrically.

And, although the illustrations and corresponding discussion pertain to ground planes that are positioned away from the direction of the emission such that the emissions first pass through absorbing material before encountering the ground plane, it is also contemplated that the reverse may be true for one or both of the respective transmission and receiver ground planes. That is, although empirically a greater improvement in undesirable attenuation may be observed having the disclosed arrangement (i.e., passing first through absorber before encountering the ground plane), attenuation also occurs when the situation is reversed, and the ground plane is encountered before passing to the absorber material.

Figure 13:
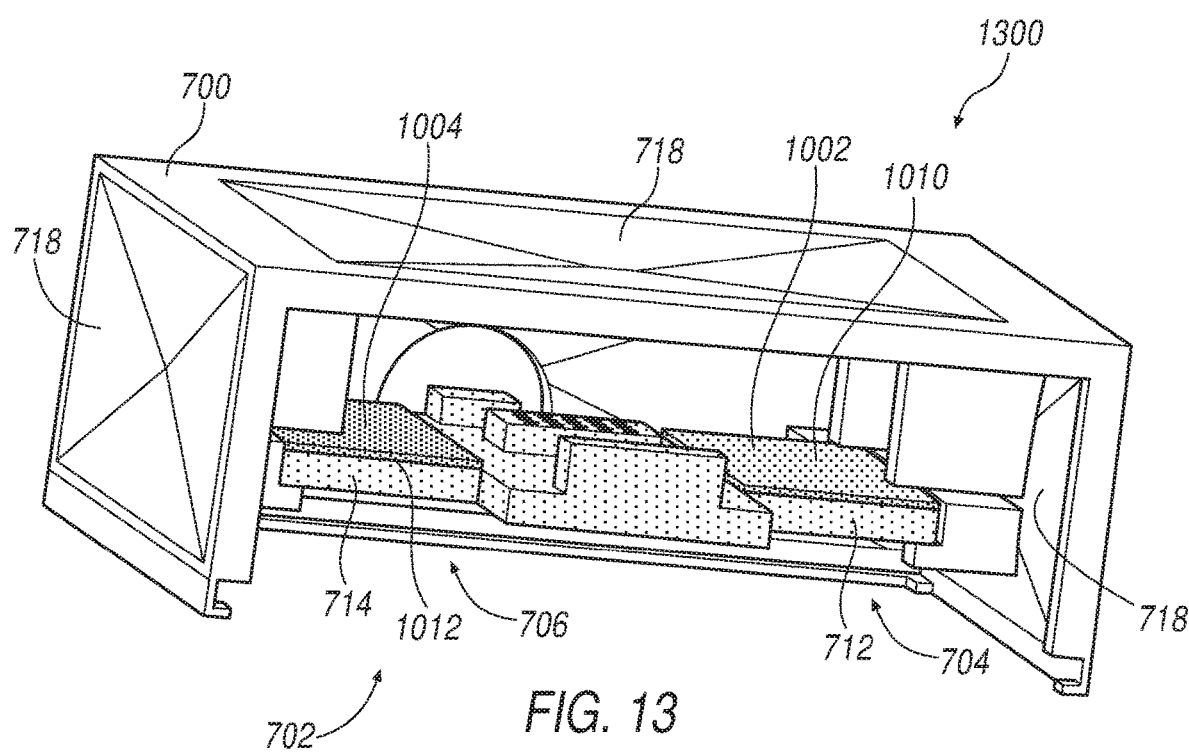
FIG. 13 shows a portion of an enclosure and having a UWB transmitter array positioned therein.

Referring now to FIG. 13, illustration 1300 shows a portion of enclosure 700 and having UWB transmitter array 702 positioned therein, corresponding generally to FIG. 7. However, also illustrated in FIG. 13 is first wing 712 having transmitter 704, and second wing 706 having receiver 706. Illustration 1300 shows first absorber 1002 and its respective first ground plane 1010, and second absorber 1004 and its respective ground plane 1012, consistent with the descriptions. According to the disclosure the ground planes are thereby attached to their respective absorbing materials and positioned within the enclosure. However it is contemplated that additional ground planes, not shown, positioned within enclosure 700 further mitigate or reduce extraneous electrical noise. Such ground planes may be positioned in various locations within the enclosure and may be electrically connected to the other ground planes, biased in a similar fashion, biased separately, or left to electrically float separate from the other other ground planes.

Figure 14:
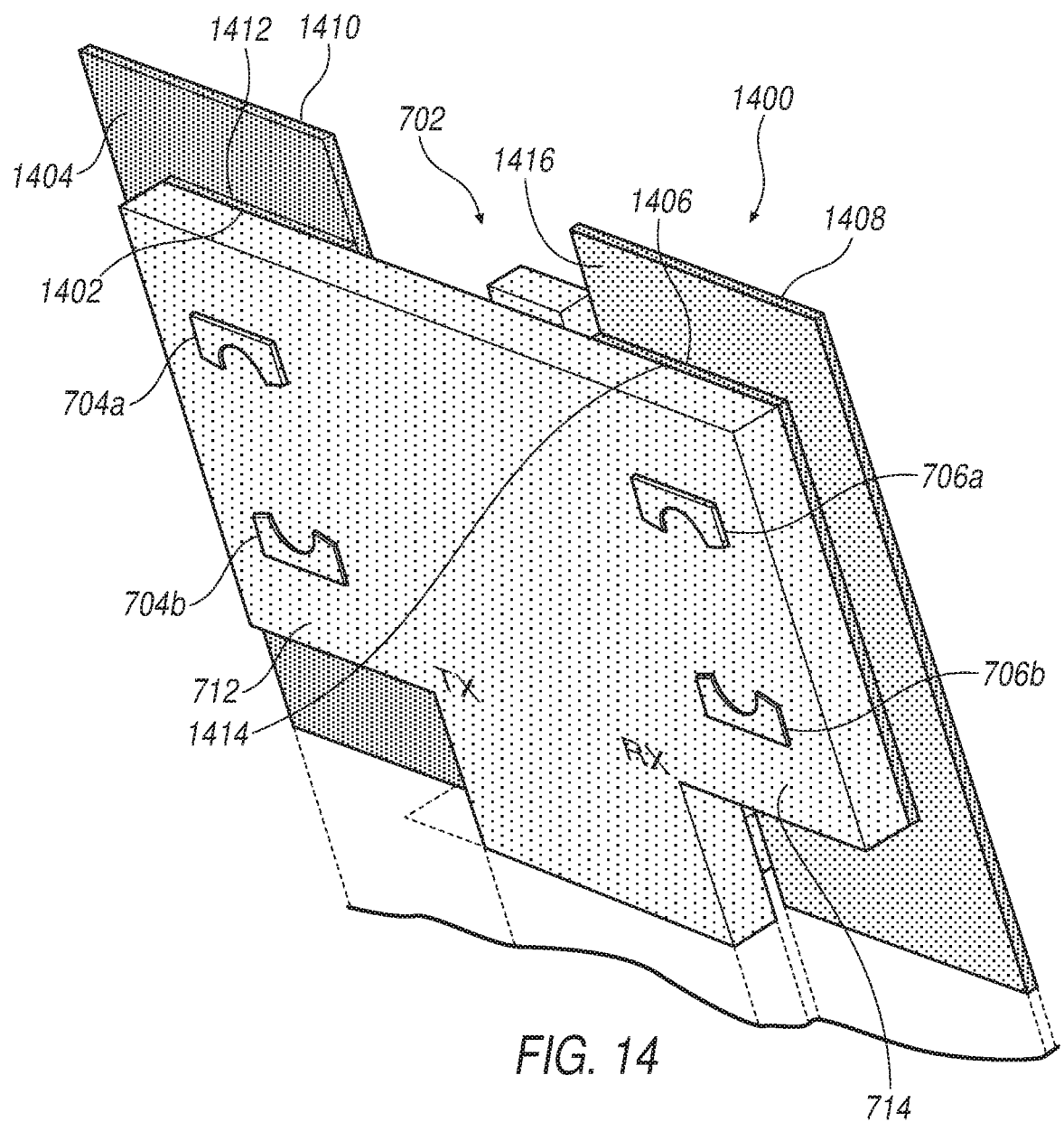
FIG. 14 illustrates a UWB transmitter array having first wing and transmitter elements, and two absorbers, and second wing having receiver elements and two absorbers.

According to the disclosure, it is contemplated that more than one absorber may be employed to attenuate undesirable emissions. For instance, referring to FIG. 14, illustration 1400 includes UWB transmitter array 702 having first wing 712 having transmitter elements 704a, 704b includes two absorbers 1402, 1404, and second wing 714 having receiver elements 706a, 706b includes two absorbers 1406, 1408. Absorbers 1402, 1404, and absorbers 1406, 1408, likewise include respective ground planes 1412, 1414 and 1414, 1416 which, as disclosed, are positioned away from their respective sources of incoming waves. Accordingly, emissions passing therethrough in each case are first passed through absorbing material and then to a ground plane. However, in this case a second absorbing material and ground plane are encountered, providing yet additional attenuation to noise-generating wave emissions.

Figure 15:
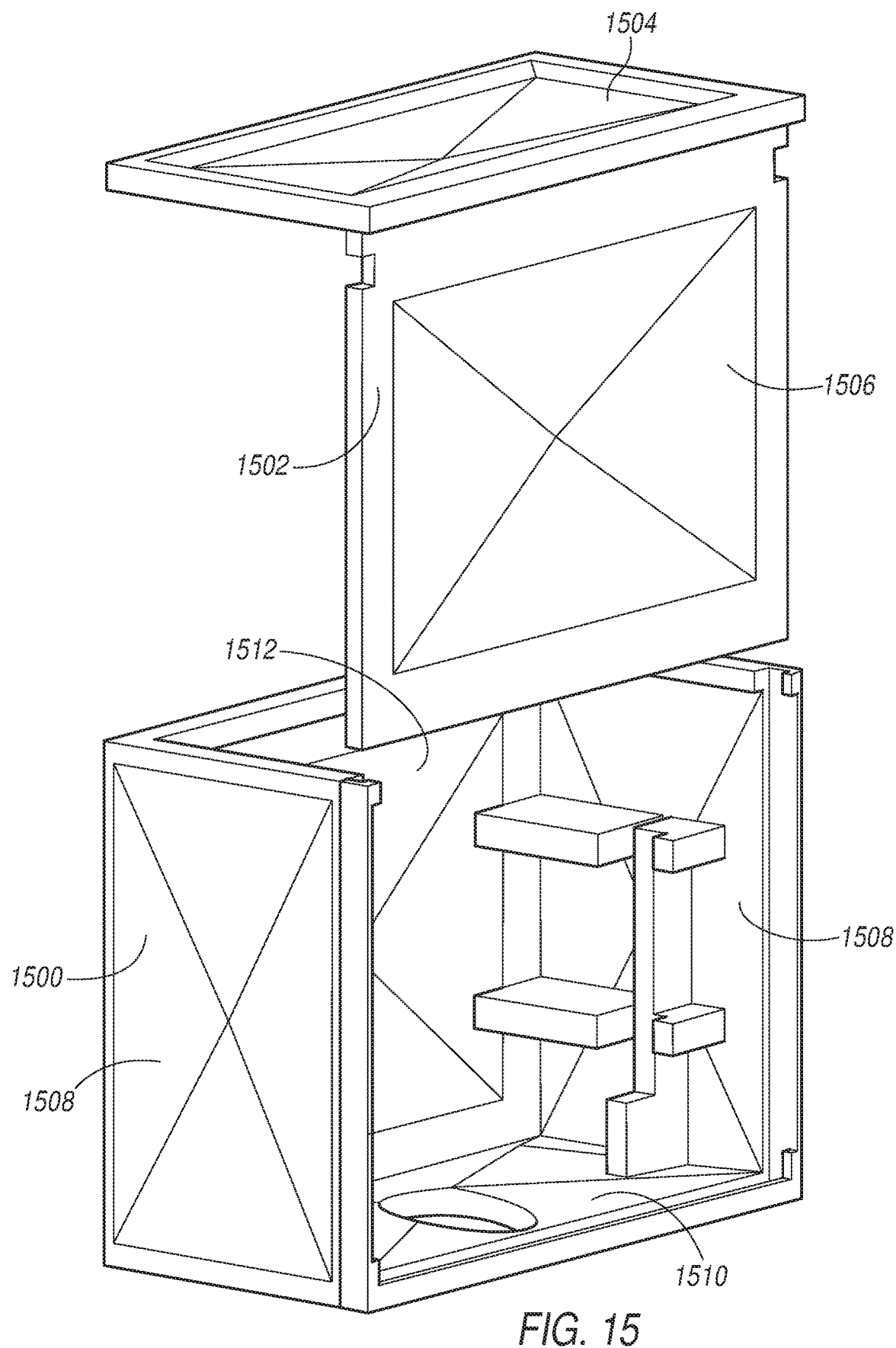
FIG. 15 shows a full enclosure as a first portion and as a second portion.

According to the disclosure, attenuation of electrical noise is obtained not only via absorbing materials and their respective ground planes, to absorb reflected emissions, but also through oblique-angled surfaces of the enclosure. In one example, the enclosure itself is an absorbing material that, as discussed, absorbs electromagnetic energy and converts it into heat. Referring back to FIGS. 7 and 13, enclosure 700 includes outer walls 718. FIGS. 7 and 13 show only a portion of enclosure 700, and FIG. 15 shows the full enclosure as first portion 1500 and second portion 1502. First and second portions 1500, 1502 engage one another and include additional structural elements such that the two fit together and enclose transmitter array 702 (not shown in FIG. 15). Outer walls of first and second portions 1500, 1502 include oblique surfaces such that emissions falling generally perpendicular thereto do not reflect back in the same direction. For instance, referring back to FIG. 8, back lobe 806 includes a relatively intense level of emission compared to that of side lobes 808. And, although back lobe 806 is typically of much lower intensity than main lobe 802, back lobe 806 also represents an emission that, if reflected directly back from a wall of the enclosure, could fall upon the receiver and cause unnecessary noise. Thus, according to the disclosure and to prevent back lobe 806 from being reflected directly back to the receiver, enclosure portions 1500, 1502 includes walls having oblique surfaces. A top wall 1504, a front wall 1506, side walls 1508, bottom wall 1510, and back wall 1512 include oblique surfaces that are generally not aligned with a plane passing through an outer perimeter of each wall. In other words, and as examples, the walls are formed into a generally rectangular structure, and if walls were formed (as in a conventional structure, such as a box), then the walls would be generally perpendicular to main lobe 802 and back lobe 806. However, according to the disclosure, some or all of walls 1504-1512 include surfaces that are oblique with respect to the overall structure. Walls 1504-1512 thereby include impressions that result in surface orientations that are oblique with respect to the overall structure of portions 1500, 1502.

As such, and as illustrated in FIG. 9, reflected emissions not only include lower intensity, but if directed in a different direction and away from the receiver, they will have minimal further impact on the receiver and thus noise is reduced. As such, emissions from a transmitter, such as transmitter elements 704a, 704b, are not are not reflected directly back to receiver elements 706a, 706b. Instead, emissions passing to the walls are benignly emitted in an off-direction and away from receiver elements 706a, 706b, further reducing noise that occurs inside the enclosure due to back lobe 806 and side lobes 808.

Figure 16:
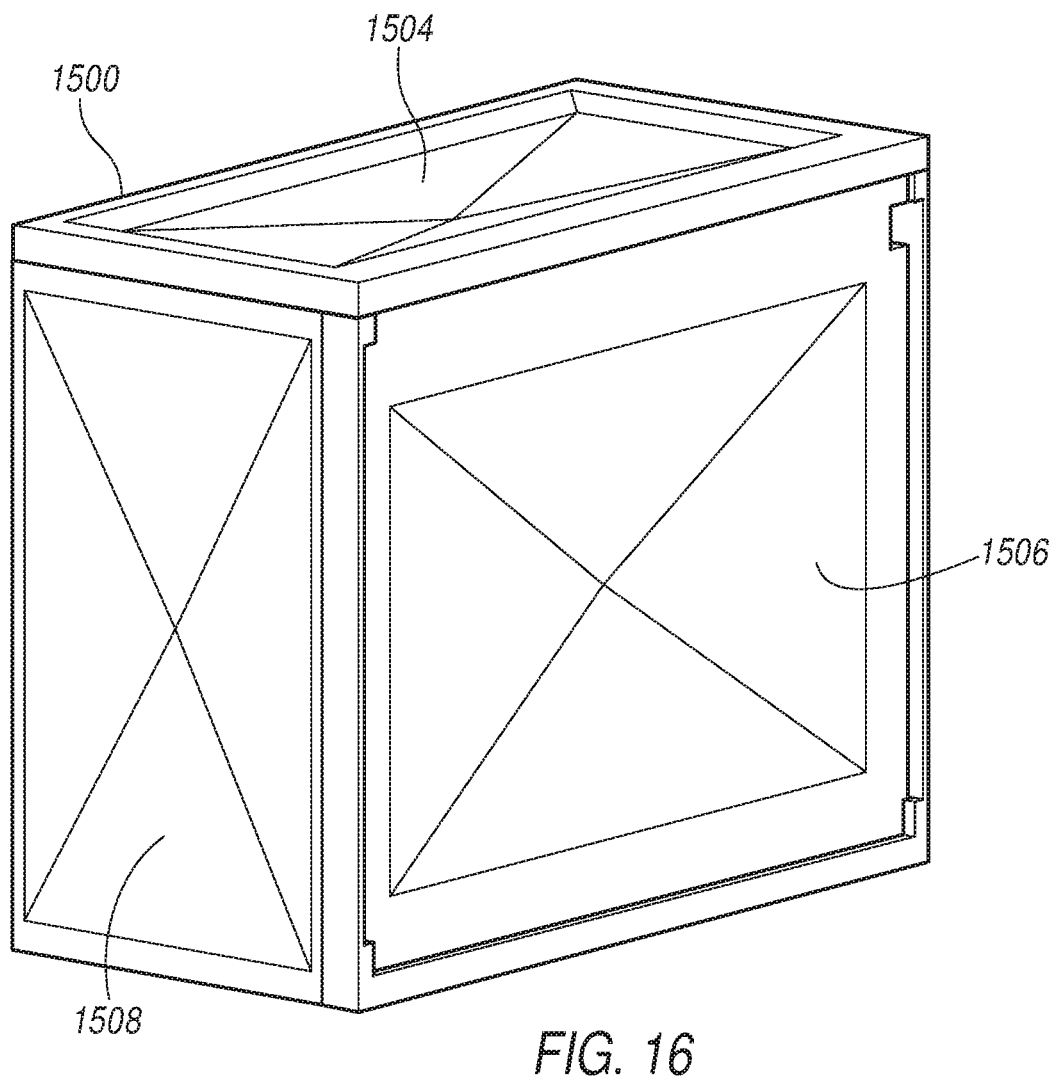
FIG. 16 shows the full enclosure in its assembled form.

FIG. 16 shows enclosure 1500 in its assembled form, having UWB transmitter array 702 positioned therein (not visible) and having oblique surfaces 1504, 1506, and 1508 visible in this perspective view.

Thus, according to the disclosure, an ultra-wideband (UWB) system includes an enclosure, and an ultra-wideband (UWB) transmitter array within the enclosure, the UWB transmitter array having a transmitter component that transmits electromagnetic waves toward a region-of-interest (ROI), the UWB array having a receiver component that receives reflected electromagnetic waves from objects in the ROI and generates object data. The system further includes a radar absorbing material positioned to receive electromagnetic waves transmitted from the transmitter component that are not directed toward the ROI, and a pattern recognition device having a processor configured to process the electromagnetic waves reflected from the ROI and to determine whether an object-of-interest (OOI) pattern is recognized within the object data.

Also according to the disclosure, a method of assembling an ultra-wideband (UWB) system includes positioning an ultra-wideband (UWB) transmitter array within an enclosure, the UWB transmitter array having a transmitter component that transmits electromagnetic waves toward a region-of-interest (ROI), the UWB array having a receiver component that receives reflected electromagnetic waves from objects in the ROI and generates object data, positioning a radar absorbing material to receive electromagnetic waves transmitted from the transmitter component that are not directed toward the ROI, and configuring a pattern recognition device to process the electromagnetic waves reflected from the ROI and to determine whether an object-of-interest (OOI) pattern is recognized within the object data.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Accordingly, it is to be understood that the above description is intended to be illustrative and not restrictive. Many examples and applications other than those provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An ultra-wideband (UWB) system comprising:
   an enclosure;
   an ultra-wideband (UWB) transmitter array within the enclosure, the UWB transmitter array having i) a transmitter component that transmits electromagnetic waves toward a region-of-interest (ROI) and ii) a receiver component that receives reflected electromagnetic waves from objects in the ROI to generates object data;
   a first radar absorber positioned proximate the transmitter component, the first radar absorber is configured to receive electromagnetic waves transmitted from the transmitter component that are not directed toward the ROI, wherein the first absorber includes a first face that is facing toward the transmitter component and the ROI and a second face that is facing away from the transmitter component;
   a first ground plane having a first ground plane face facing the transmitter component and the ROI and a second ground plane face facing away from the transmitter component, the first ground plane face is coupled to the second face of the first radar absorber, wherein the second ground plane face is free of radar absorbing materials;
   a second radar absorber positioned proximate the receiver component, the second absorber includes a third face that is facing the receiver component and the ROI and a fourth face that is facing away from the receiver component, wherein the first radar absorber and the second radar absorber are comprised of a radar absorbing material;
   a second ground plane coupled to the third face of the second radar absorber; and
   a pattern recognition device having a processor configured to process the electromagnetic waves reflected from the ROI and to determine whether an object-of-interest (OOI) pattern is recognized within the object data.

2. The system of claim 1, wherein the transmitter component and the receiver component are positioned on a front side of a base support that is facing toward the ROI.

3. The system of claim 2, wherein the base support includes a back side that is opposite the front side, wherein the first radar absorber is positioned on the back side of the base support.

4. The system of claim 2, wherein the transmitter component is laterally offset from the receiver component.

5. The system of claim 2, wherein the second ground plane is placed between the second absorber and the base support.

6. The system of claim 1, wherein the enclosure includes at least one wall having a surface that is at an oblique angle with respect to an incoming back lobe of energy that is emitted from the transmitter component.

7. The system of claim 1, wherein at least one wall of the enclosure is a radar absorbing material.

8. A method of assembling an ultra-wideband (UWB) system, comprising:
  positioning an ultra-wideband (UWB) transmitter array within an enclosure, the UWB transmitter array having a transmitter component that transmits electromagnetic waves toward a region-of-interest (ROI), the UWB array having a receiver component that receives reflected electromagnetic waves from objects in the ROI and generates object data;
  coupling a first radar absorber to a first ground plane, the first radar absorber has a first face facing the transmitter component and the ROI and a second face facing away from the transmitter component, the first ground plane has a first ground plane face facing the transmitter component and the ROI and a second ground plane face facing away from the transmitter component, wherein the first ground plane face is coupled to the first radar absorber and the second ground plane face is free of radar absorbing material, and wherein the first absorber is configured to receive electromagnetic waves transmitted from the transmitter component that are not directed toward the ROI;
  coupling a second radar absorber to a second ground plane, the second radar absorber has a third face facing the receiver component and a fourth face facing away from the receiver component, wherein the coupling of the second radar absorber to the second ground plane comprises coupling the third face of the second absorber to the second ground plane; and
  configuring a pattern recognition device to process the electromagnetic waves reflected from the ROI and to determine whether an object-of-interest (OOI) pattern is recognized within the object data.

9. The method of claim 8, further comprising positioning the transmitter component and the receiver component on a front side of a base support that is facing toward the ROI.

10. The method of claim 9, wherein the base support includes a back side that is opposite the front side;
  further comprising positioning the first radar absorber on the back side of the base support.

11. The method of claim 9, further comprising laterally offsetting the transmitter component from the receiver component.

12. The method of claim 9,
  further comprising coupling the second ground plane to the base support.

13. The method of claim 8, further comprising forming the enclosure to include at least one wall having a surface that is at an oblique angle with respect to an incoming back lobe of energy that is emitted from the transmitter component.

14. The method of claim 8, further comprising forming the enclosure from a radar absorbing material.

* * * * *